(12) United States Patent
Nagumo et al.

(10) Patent No.: US 8,126,281 B2
(45) Date of Patent: Feb. 28, 2012

(54) IMAGE PROCESSING APPARATUS, METHOD, AND COMPUTER-READABLE MEDIUM FOR GENERATING MOTION COMPENSATION IMAGES

(75) Inventors: Takefumi Nagumo, Kanagawa (JP); Hideyuki Ichihashi, Tokyo (JP)

(73) Assignee: Sony Corporation, Tokyo (JP)

( * ) Notice: Subject to any disclaimer, the term of this patent is extended or adjusted under 35 U.S.C. 154(b) by 766 days.

(21) Appl. No.: 12/204,255

(22) Filed: Sep. 4, 2008

(65) Prior Publication Data

US 2009/0060284 A1 Mar. 5, 2009

(30) Foreign Application Priority Data

Sep. 5, 2007 (JP) ................................ P2007-230054

(51) Int. Cl.
*G06K 9/36* (2006.01)
*G06K 9/00* (2006.01)
*G06K 9/46* (2006.01)
(52) U.S. Cl. ........................................ 382/236; 382/107
(58) Field of Classification Search .................. 382/107, 382/232, 233, 236, 239, 250, 251; 375/240.03, 375/240.12, 240.16, E7.14, E7.092, E7.145; 341/50; 348/415.1
See application file for complete search history.

(56) References Cited

U.S. PATENT DOCUMENTS

| | | | | |
|---|---|---|---|---|
| 5,426,463 A | * | 6/1995 | Reininger et al. | 375/240.03 |
| 5,467,086 A | * | 11/1995 | Jeong | 341/50 |
| 5,592,302 A | * | 1/1997 | Hirabayashi | 382/236 |
| 5,844,613 A | * | 12/1998 | Chaddha | 375/240.12 |
| 6,058,141 A | * | 5/2000 | Barger et al. | 375/240 |
| 6,275,531 B1 | * | 8/2001 | Li | 375/240.12 |
| 6,529,631 B1 | * | 3/2003 | Peterson et al. | 382/232 |
| 6,625,211 B1 | * | 9/2003 | Etoh et al. | 375/240.03 |
| 2005/0175101 A1 | * | 8/2005 | Honda et al. | 375/240.16 |
| 2009/0060284 A1 | * | 3/2009 | Nagumo et al. | 382/107 |

FOREIGN PATENT DOCUMENTS

| | | |
|---|---|---|
| JP | 8-65675 | 3/1996 |
| JP | 8-65676 | 3/1996 |
| JP | 2001-352549 | 12/2001 |
| JP | 2006-246396 | 9/2006 |

OTHER PUBLICATIONS

Michel Irani et al., "Improving Resolution by Image Registration", CVGIP: Graphical Models and Image Processing, vol. 53, No. 3, May, pp. 231-239, 1991.

* cited by examiner

*Primary Examiner* — Amir Alavi
(74) *Attorney, Agent, or Firm* — Finnegan, Henderson, Farabow, Garrett & Dunner, L.L.P.

(57) ABSTRACT

An image processing apparatus for generating a motion compensation image. The image processing apparatus includes: a pixel-relative-position calculation section calculating a relative position between a pixel position of a pixel constituting the motion compensation image and a pixel position of a reference pixel of a reference image to be used for calculating a pixel value of the pixel on the basis of motion vector information; a relative-position quantization section performing quantization processing of relative-position information calculated by the pixel-relative-position calculation section and generating quantized-relative-position information; and a motion-compensation-image generation section generating a motion compensation image by calculating a pixel value of a constituent pixel of the motion compensation image on the basis of the quantized-relative-position information and a pixel value of the reference pixel.

9 Claims, 17 Drawing Sheets

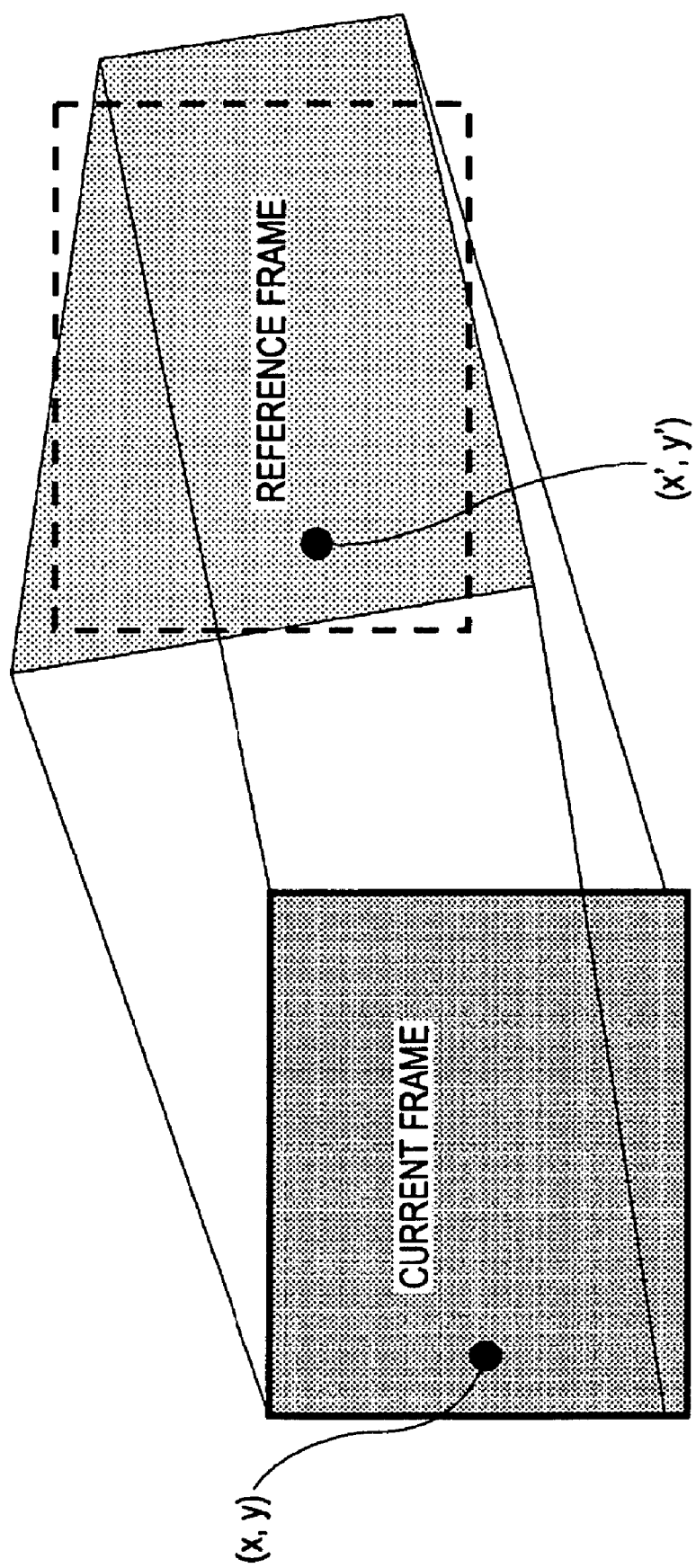

$$\text{output\_pixel} = (a00 \times (1-\text{HorPos}) + a01 \times \text{HorPos}) \times (1-\text{VerPos})$$
$$+ (a10 \times (1-\text{HorPos}) + a11 \times \text{HorPos}) \times \text{VerPos}$$

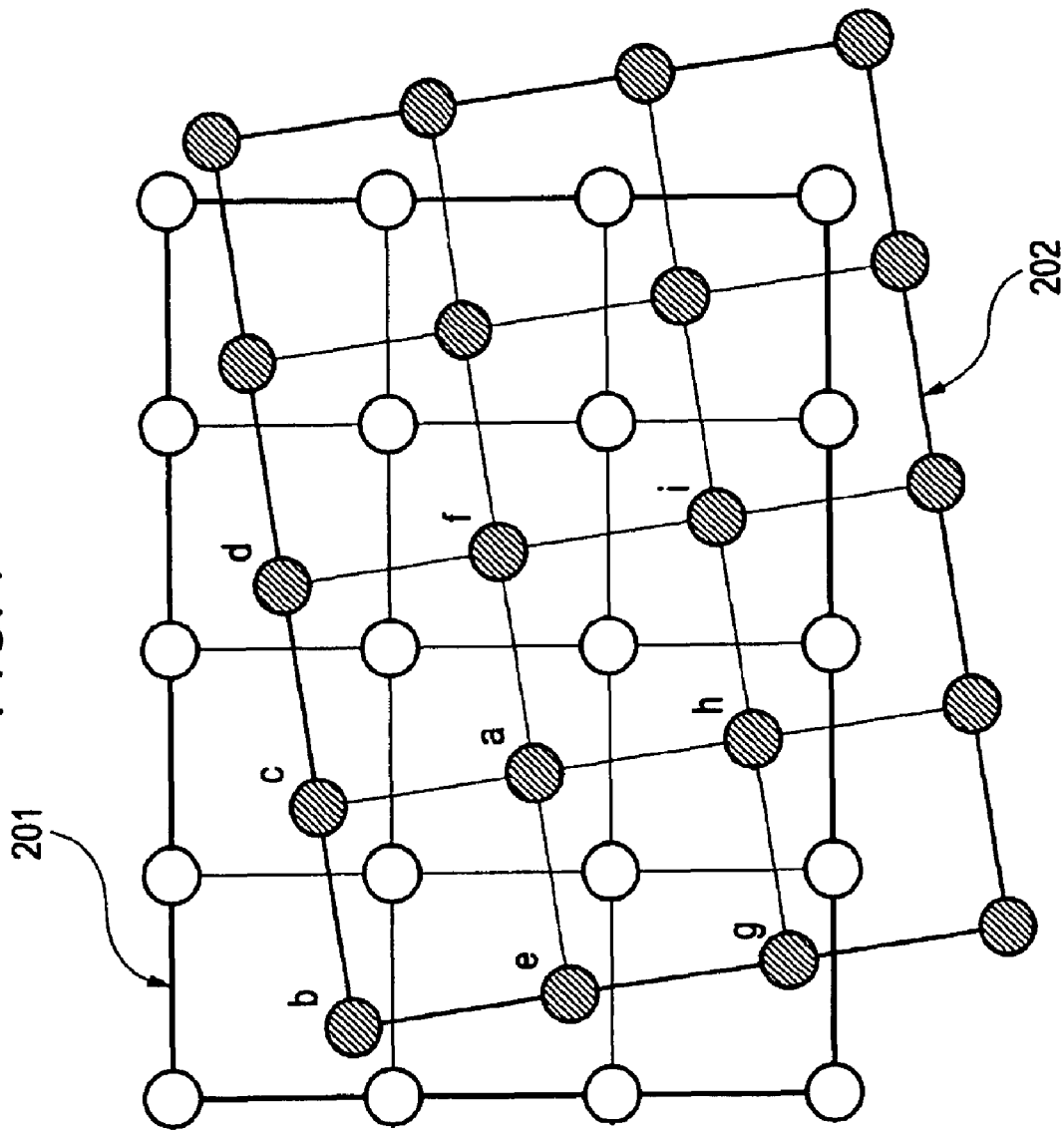

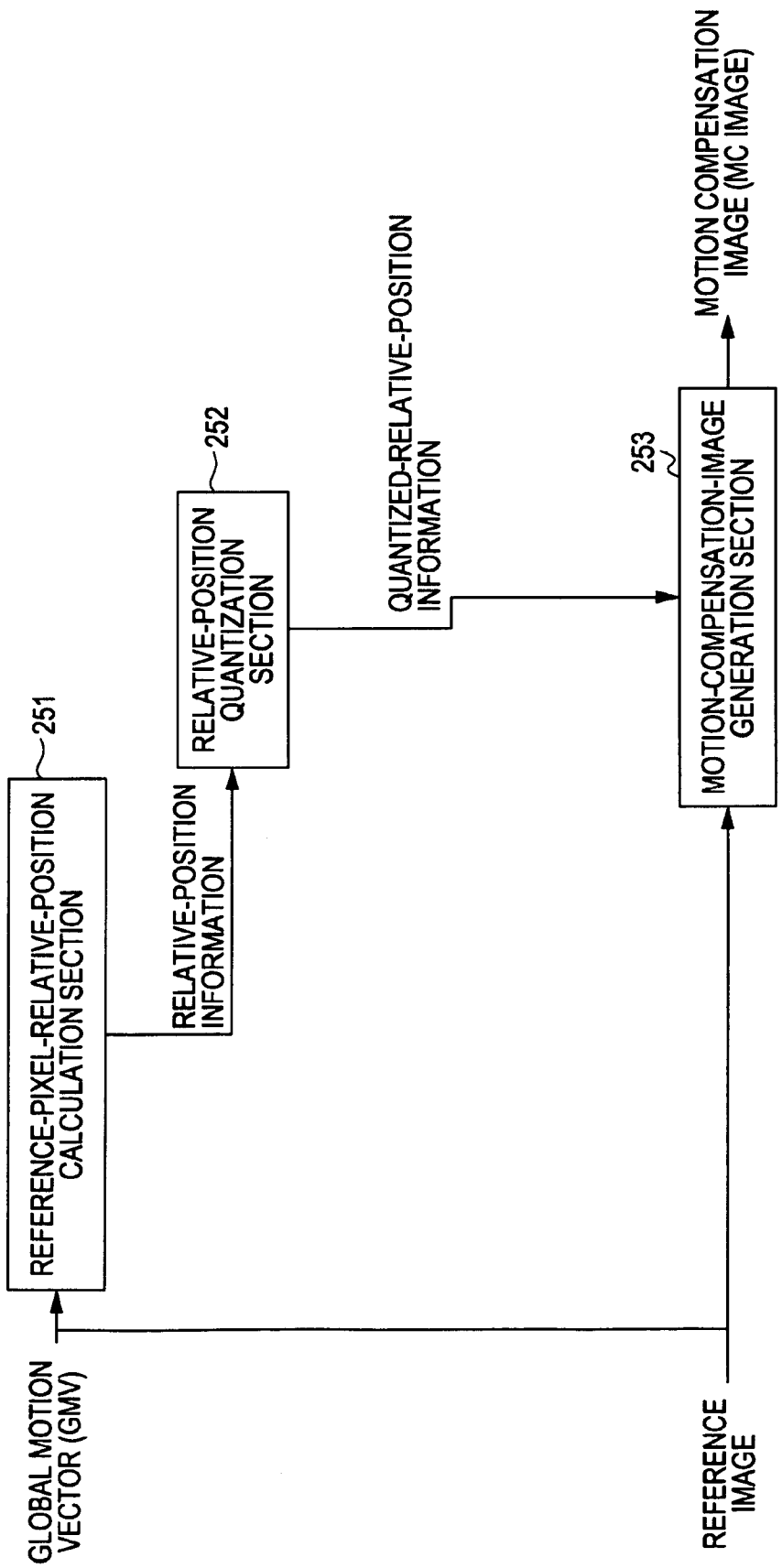

IMAGE PROCESSING APPARATUS, METHOD, AND COMPUTER-READABLE MEDIUM FOR GENERATING MOTION COMPENSATION IMAGES

CROSS REFERENCES TO RELATED APPLICATIONS

The present invention contains subject matter related to Japanese Patent Application JP 2007-230054 filed in the Japanese Patent Office on Sep. 5, 2007, the entire contents of which are incorporated herein by reference.

BACKGROUND OF THE INVENTION

1. Field of the Invention

The present invention relates to an image processing apparatus, an image processing method, and a computer program. More particularly, the present invention relates to an image processing apparatus, an image processing method, and a computer program which generate a motion compensation (MC) image to be used for super-resolution processing, coding processing, etc., of an image.

2. Description of the Related Art

For a method of generating a high-resolution image from low-resolution images, super-resolution processing is known. The super-resolution processing is processing which obtains pixel values of individual pixels of a high-resolution image of one frame from a plurality of overlapping low-resolution images.

By super-resolution processing, it becomes possible to reconstruct an image having a resolution higher than a resolution of original images captured by an imaging device, such as a CCD (Charge Coupled Device), a CMOS (Complementary Metal Oxide Semiconductor), etc., for example. Specifically, super-resolution is used when generating a satellite photograph having a high resolution, and the like. In this regard, for super-resolution processing, for example, a description has been given by "Improving Resolution by Image Registration", MICHAL IRANI AND SHMUEL PELEG, Department of Computer Science, The Hebrew University of Jerusalem, 91904 Jerusalem, Israel, Communicated by Rama Chellapa, Received Jun. 16, 199; accepted May 25, 1990.

A description will be given of a principle of super resolution with reference to FIGS. 1 and 2: Letters, a, b, c, d, e, f, shown in the upper part in FIGS. 1A and 1B indicate pixel values of a high-resolution image (SR (Super Resolution) image) to be obtained from low-resolution images (LR images) obtained by shooting a certain subject. That is to say, the letters indicate the pixel values of the individual pixels when the subject is represented by pixels with the same resolution as the resolution of the SR image.

For example, if it is assumed that the width of one pixel of an imaging device is twice the width of a pixel constituting a subject image, the subject image is difficult to be directly captured with the resolution. As shown in FIG. 1A, the left pixel, out of the three pixels of the imaging device, captures the pixel value of A, which combines the pixel values of a and b. The central pixel captures the pixel value of B, which combines the pixel values of c and d. Also, the right pixel captures the pixel value of C, which combines the pixel values of e and f. Here, A, B, and C indicate pixel values of pixels constituting an LR image obtained by shooting.

Together with the subject image in FIG. 1A, it is assumed that the subject image at a position shifted by a width of 0.5 pixel of the pixel constituting the subject is captured (captured while being shifted) by camera shake, etc., as shown in FIG. 1B on the basis of the position of the subject image in FIG. 1A. The left pixel, out of the three pixels of the imaging device, captures the pixel value of D, which combines the pixel values of a half of a, the whole of b, and a half of c. The central pixel captures the pixel value of E, which combines the pixel values of a half of c, the whole of d, and a half of e. Also, the right pixel captures the pixel value of F, which combines the pixel values of a half of e, and the whole of f. Here, D, E, and F indicate pixel values of pixels constituting an LR image obtained by shooting.

The following expression (Expression 1) is obtained from the shooting result of such LR images. By individually obtaining a, b, c, d, e, and f from Expression 1, it becomes possible to obtain an image having a higher resolution than the resolution of the imaging device.

[Expression 1]

$$\begin{pmatrix} 1 & 1 & 0 & 0 & 0 & 0 \\ 0 & 0 & 1 & 1 & 0 & 0 \\ 0 & 0 & 0 & 0 & 1 & 1 \\ 1/2 & 1 & 1/2 & 0 & 0 & 0 \\ 0 & 0 & 1/2 & 1 & 1/2 & 0 \\ 0 & 0 & 0 & 0 & 1/2 & 1 \end{pmatrix} \begin{pmatrix} a \\ b \\ c \\ d \\ e \\ f \end{pmatrix} = \begin{pmatrix} A \\ B \\ C \\ D \\ E \\ F \end{pmatrix} \quad \text{(Expression 1)}$$

A description will be given of super-resolution processing by back projection as a method of super-resolution processing, which has been known to date, with reference to FIG. 2. An image processing apparatus 1 shown in FIG. 2 is disposed, for example, in a digital camera, and performs processing on a still image obtained by shooting.

As shown in FIG. 2, the image processing apparatus 1 includes super-resolution processing sections 11a to 11c, a summation processing section 12, an addition processing section 13, and an SR image buffer 14. For example, LR0, which is an LR image obtained by shooting and has a low resolution, is input into the super-resolution processing section 11a, and LR1 is input into the super-resolution processing section 11b. Also, LR2 is input into the super-resolution processing section 11c. LR0 to LR2 are images captured consecutively, and have overlapping shooting ranges individually. When images are captured consecutively, in general, the ranges of a subject shot on shooting-result images are slightly shifted individually because of camera shake, etc., and thus they do not completely match, but overlap one another partly.

The super-resolution processing section 1a generates a difference image showing the difference thereof on the basis of the low-resolution image LR0 and a high-resolution image, an SR image, stored in the SR image buffer 14, and outputs a feedback value to the summation processing section 12. The feedback value indicates a value representing the difference image having the same resolution as the SR image.

In this regard, the SR-image buffer 14 stores an SR image, which is a high-resolution image generated by the super-resolution processing performed immediately before. When the processing has just started, and one frame of the SR image has not yet been generated, for example, an image obtained by up-sampling LR0 to an image having the same resolution as the SR image is stored in the SR-image buffer 14.

In the same manner, the super-resolution processing section 11b generates a difference image showing the difference thereof on the basis of the low-resolution image LR1 of the next frame and the high-resolution image, the SR image, stored in the SR image buffer 14, and outputs a feedback value representing the generated difference image to the summation processing section 12.

Further, the super-resolution processing section 11c generates a difference image showing the difference thereof on the basis of the next low-resolution image LR2 and the high-resolution image, the SR image, stored in the SR image buffer 14, and outputs a feedback value representing the generated difference image to the summation processing section 12.

The summation processing section 12 averages the feedback values supplied from the super-resolution processing sections 11a to 11c, and outputs an image having the same resolution as that of the SR image to the addition processing section 13. The addition processing section 13 adds the SR image stored in the SR image buffer 14 and the SR image supplied from the summation processing section 12, and outputs the SR image obtained by the addition. The output of the addition processing section 13 is supplied to the outside of the image processing apparatus 1, and is also supplied to the SR image buffer 14 to be stored.

FIG. 3 is a block diagram illustrating an example of the configuration of the super-resolution processing section 11 (the super-resolution processors 11a to 11c). As shown in FIG. 3, the super-resolution processing section 11 includes a motion-vector detection section 21, a motion-compensation processing section 22, a down-sampling processing section 23, an addition processing section 24, an up-sampling processing section 25, and a reverse-direction motion compensation processing section 26.

The high-resolution image, the SR image, which has been read from the SR image buffer 14, is input into the motion-vector detection section 21 and the motion-compensation processing section 22. The low-resolution image, LRn, obtained by shooting, is input into the motion-vector detection section 21 and the addition processing section 24.

The motion-vector detection section 21 detects a motion vector based on the SR image on the basis of the input high-resolution image, the SR image, and the low-resolution image, LRn, and outputs the detected motion vector to the motion-compensation processing section 22 and the reverse-direction motion compensation processing section 26. For example, by block matching between the SR image generated on the basis of a past captured image and the LRn image newly input, the motion-vector detection section 21 generates a vector indicating a movement destination of each block of the SR image in the newly input LRn image.

The motion-compensation processing section 22 performs motion compensation on the high-resolution image, the SR image, on the basis of the motion vector supplied from the motion-vector detection section 21 to generate a motion compensation (MC) image, and outputs the generated motion compensation image (MC image) to the down-sampling processing section 23. The motion compensation processing is processing which moves the pixel position of the SR image in accordance with the motion vector in order to generate a compensated SR image having a position corresponding to the LRn image newly input. That is to say, the motion-compensation processing section 22 moves the pixel position of the SR image to generate a motion compensation image (MC image) in which the position of an object on the SR image is matched with the position of the object on LRn.

The down-sampling processing section 23 generates an image having the same resolution as that of LRn by down sampling the image supplied from the motion-compensation processing section 22, and outputs the generated image to the addition processing section 24. Obtaining a motion vector from the SR image and LRn, and making the image obtained by performing compensation using the obtained motion vector to have the same resolution as that of the LR image is equivalent to performing simulation of the image obtained by shooting on the basis of the SR image stored in the SR image buffer 14.

The addition processing section 24 generates a difference image showing the difference between LRn and the image simulated in that manner, and outputs the generated difference image to the up-sampling processing section 25.

The up-sampling processing section 25 generates an image having the same resolution as that of the SR image by up sampling the difference image supplied from the addition processing section 24, and outputs the generated image to the reverse-direction motion compensation processing section 26. The reverse-direction motion compensation processing section 26 performs motion compensation in the reverse direction on the image supplied from the up-sampling processing section 25 on the basis of the motion vector supplied from the motion-vector detection section 21, and outputs a feedback value indicating the image obtained by performing the reverse-direction motion compensation to the summation processing section 12 shown in FIG. 2. A position of an object shown in the image obtained by performing the reverse-direction motion compensation becomes a near position to the position of the object shown in the SR image stored in the SR image buffer 14.

SUMMARY OF THE INVENTION

As described above, in super-resolution processing which receives input of low-resolution images and obtains a high-resolution image, it becomes necessary to perform generation processing of a motion compensation image (MC image). In this regard, the generation processing of a motion compensation image (MC image) is performed not only in the above-described super-resolution processing, but also sometimes performed in compression coding processing of an image, etc. However, in the generation of the motion compensation image (MC image), it becomes necessary to calculate pixel values corresponding to movement positions of pixels, which are calculated on the basis of motion vectors. Accordingly, there is a problem in that the calculation cost becomes high and the processing time becomes long in order to calculate the destinations and the pixel values of all the pixels constituting an image.

The present invention has been made in view of the above-described problems. It is desirable of provide an image processing apparatus, an image processing method, and a computer program which make it possible to efficiently generate a motion compensation image (MC image) at a high speed.

According to an embodiment of the present invention, there is provided an image processing apparatus for generating a motion compensation (MC) image, including: a pixel-relative-position calculation section calculating a relative position between a pixel position of a pixel constituting the motion compensation image and a pixel position of a reference pixel of a reference image to be used for calculating a pixel value of the pixel on the basis of motion vector information; a relative-position quantization section performing quantization processing of relative-position information calculated by the pixel-relative-position calculation section and generating quantized-relative-position information; and a motion-compensation-image generation section generating a motion compensation image by calculating a pixel value of a constituent pixel of the motion compensation image on the basis of the quantized-relative-position information and a pixel value of the reference pixel.

Further, the image processing apparatus according to an embodiment of the present invention may further include: a relative-position-averaging processing section receiving input of the quantized-relative-position information, and performing averaging processing of the quantized-relative-position information corresponding to a plurality of pixels of the motion compensation image, wherein the relative-position-averaging processing section may perform the averaging processing of the quantized-relative-position information such that the quantized relative position becomes identical for each number of pixels determined in accordance with a number of bits capable of being operated in parallel in the motion-compensation-image generation section, and the motion-compensation-image generation section may generate the motion compensation image by calculating the pixel value of the constituent pixel of the motion compensation image on the basis of the quantized-relative-position information set to have an identical value for each of the plurality of pixels generated by the relative-position-averaging processing section and the pixel value of the reference pixel.

Further, in the image processing apparatus according to an embodiment of the present invention, the motion-compensation-image generation section may perform pixel-value calculation applying an SIMD (Single Instruction Multiple Data) processor, may perform parallel calculation for each of the plurality of pixels having the quantized-relative-position information set to have an identical value, and may calculate pixel values corresponding to the plurality of pixels.

Further, the image processing apparatus according to an embodiment of the present invention may further include: a relative-position-copy processing section, wherein the pixel-relative-position calculation section may calculate the relative position with the pixel position of the reference pixel of the reference image only partly on a processing pixel selected from the pixels constituting the motion compensation image, the relative-position quantization section performing quantization processing of the relative-position information corresponding to the processing pixel whose relative position is calculated by the pixel-relative-position calculation section, the relative-position-copy processing section may perform setting processing of a quantized relative position identical to that of the processing pixel whose quantized relative position is calculated for a non-processing pixel whose quantized relative position is not calculated, and the motion-compensation image generation section may generate a motion compensation image by calculating the pixel value of the constituent pixel of the motion compensation image on the basis of the quantized-relative-position information input from the relative-position-copy processing section and a pixel value of the reference pixel.

Further, in the image processing apparatus according to an embodiment of the present invention, the pixel-relative-position calculation section may calculate the relative position between the pixel position of the pixel constituting the motion compensation image and the pixel position of the reference pixel of the reference image to be used for calculating a pixel value of the pixel on the basis of a global motion vector (GMV) being a motion vector common to a plurality of blocks included in an image frame.

According to another embodiment of the present invention, there is provided a method of processing an image for generating a motion compensation (MC) image in an image processing apparatus, the method including the steps of: pixel-relative-position calculating by a pixel-relative-position calculation section calculating a relative position between a pixel position of a pixel constituting the motion compensation image and a pixel position of a reference pixel of a reference image to be used for calculating a pixel value of the pixel on the basis of motion vector information; relative-position quantizing by a relative-position quantization section performing quantization processing of relative-position information calculated by the pixel-relative-position calculation section and generating quantized-relative-position information; and motion-compensation-image generating by a motion-compensation-image generation section generating the motion compensation image by calculating a pixel value of a constituent pixel of the motion compensation image on the basis of the quantized-relative-position information and a pixel value of the reference pixel.

Further, the method of processing an image according to an embodiment of the present invention may further include: relative-position averaging processing by a relative-position averaging processing section receiving input of the quantized-relative-position information, and performing averaging processing of the quantized-relative-position information corresponding to a plurality of pixels of the motion compensation image, wherein the step of relative-position averaging processing may performs the averaging processing of the quantized-relative-position information such that quantized relative positions become identical for each number of pixels determined in accordance with a number of bits capable of being operated in parallel in the motion-compensation image generation, and the step of motion-compensation image generating may generate the motion compensation image by calculating the pixel value of the constituent pixel of the motion compensation image on the basis of the quantized-relative-position information and the pixel value of the reference pixel set to have an identical value for each of the plurality of pixels generated by the step of relative-position averaging processing.

Further, in the method of processing an image according to an embodiment of the present invention, the step of motion-compensation-image generating may perform pixel-value calculation applying an SIMD (Single Instruction Multiple Data) processor, performing parallel calculation for each of the plurality of pixels having the quantized-relative-position information set to have an identical value, and calculating pixel values corresponding to the plurality of pixels.

Further, in the method of processing an image according to an embodiment of the present invention, the image processing apparatus may further include a relative-position-copy processing section, and the step of pixel-relative-position calculating may calculate the relative position with the pixel position of the reference pixel of the reference image only partly on a processing pixel selected from the pixels constituting the motion compensation image, the step of relative-position quantizing performs quantization processing of the relative-position information corresponding to the processing pixel whose relative position is calculated by the pixel-relative-position calculation section, the relative-position-copy processing section may perform setting processing of a quantized relative position identical to that of the processing pixel whose quantized relative position is calculated for a non-processing pixel whose quantized relative position is not calculated, and the step of motion-compensation image generating may generate a motion compensation image by calculating the pixel value of the constituent pixel of the motion compensation image on the basis of the quantized-relative-position information input from the relative-position-copy processing section and a pixel value of the reference pixel.

Further, in the method of processing an image according to an embodiment of the present invention, the step of pixel-relative-position calculating may calculate the relative position between the pixel position of the pixel constituting the motion compensation image and the pixel position of the reference pixel of the reference image to be used for calculating a pixel value of the pixel on the basis of a global motion vector (GMV) being a motion vector common to a plurality of blocks included in an image frame.

Moreover, according to another embodiment of the present invention, there is provided a computer program for causing an image processing apparatus to generate a motion compensation (MC) image, the program including the steps of: pixel-relative-position calculating causing a pixel-relative-position calculation section to calculate a relative position between a pixel position of a pixel constituting the motion compensation image and a pixel position of a reference pixel of a reference image to be used for calculating a pixel value of the pixel on the basis of motion vector information; relative-position quantizing causing a relative-position quantization section to perform quantization processing of relative-position information calculated by the pixel-relative-position calculation section and generating quantized-relative-position information; and motion-compensation-image generating causing a motion-compensation-image generation section to generate a motion compensation image by calculating a pixel value of a constituent pixel of the motion compensation image on the basis of the quantized-relative-position information and a pixel value of the reference pixel.

In this regard, a computer program of the present invention is a computer program capable of being provided through a storage medium and a communication medium in a computer readable format, for example, to a general-purpose computer system performing various kinds of program code. By providing such a program in a computer readable format, the processing in accordance with the program is performed on a computer system.

Other and further objects, features and advantages of the present invention will become apparent by the detailed description based on the following embodiments of the present invention and the accompanying drawings. In this regard, in this specification, a system is a logical set of a plurality of apparatuses, and is not limited to a set of constituent apparatuses that are contained in a same casing.

According to an embodiment of the present invention, in an image processing apparatus for generating a motion compensation (MC) image, a relative position is calculated between a pixel position of a pixel constituting a motion compensation image and a pixel position of a reference pixel to be used for calculating a pixel value of these pixels, the calculated relative position is quantized, and the pixel values of constituent pixels of the motion compensation image are calculated to generate a motion compensation image. Further, it becomes possible to calculate the pixel values of a motion compensation image at a fast speed by setting the same quantized relative position for each of a plurality of pixels using averaging processing and copy processing of the quantized-relative-position information to calculate pixel values with the application of SIMD. Accordingly, efficient generation of a motion compensation image is achieved.

BRIEF DESCRIPTION OF THE DRAWINGS

FIG. 5 is a diagram illustrating a relationship between corresponding points in a current frame and a reference frame, and a global motion vector (GMV);

FIG. 7 is a diagram illustrating a basic idea of generation processing of a motion compensation (MC) image according to the present invention;

FIG. 8 is a diagram illustrating an example (first embodiment) of a configuration of motion-compensation (MC) image generation means set in an image processing apparatus of the present invention;

DESCRIPTION OF THE PREFERRED EMBODIMENTS

In the following, a description will be given of details on an image processing apparatus, an image processing method, and a computer program according to the present invention with reference to the drawings.

An image processing apparatus of the present invention is an image processing apparatus which has enabled efficient and fast generation of a motion compensation (MC) image. The motion compensation image (MC image) is used, for example, as described above, super-resolution processing generating a high resolution image from low resolution images, the other image-coding processing, for example, the MPEG coding processing, and the like.

The motion compensation image (MC image) is equivalent to processing for moving an image to be subjected to motion compensation on the basis of motion vectors obtained from a plurality of images. For example, in the MPEG method, known as an image coding system, each frame is divided into blocks, and processing which detects a motion vector for each corresponding block of the current frame and the reference frame is performed. However, if motion vector information for each block is included in compression data, the amount of data increases. Thus, in the super-resolution processing described above and MPEG-4 as image coding processing, processing using a global motion vector (GMV) as one motion vector corresponding to one frame is performed.

When a camera is moved, for example, by panning, tilting, camera shake, etc., a motion vector of each block is substantially common. In such a case, it becomes possible to reduce the amount of data and to efficiently perform processing not using the motion vector for each block, but using a global motion vector (GMV), which is one motion vector corresponding to one frame.

A motion vector for each one block is called a local motion vector (LMV), and one motion vector corresponding to one frame is called a global motion vector (GMV).

Figure 1A:
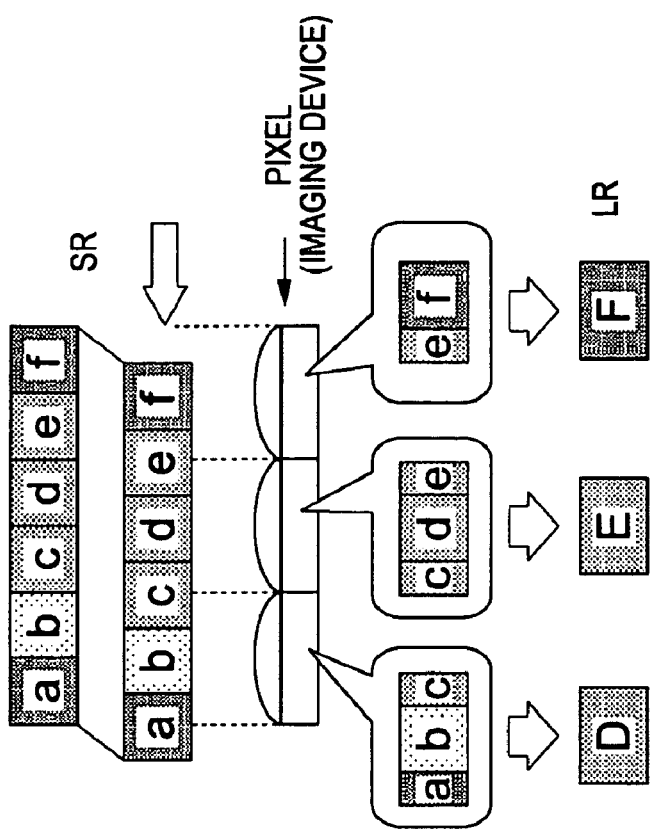
FIGS. 1A and 1B are diagrams illustrating super-resolution processing for generating a high-resolution image from low-resolution images.
Figure 1B:
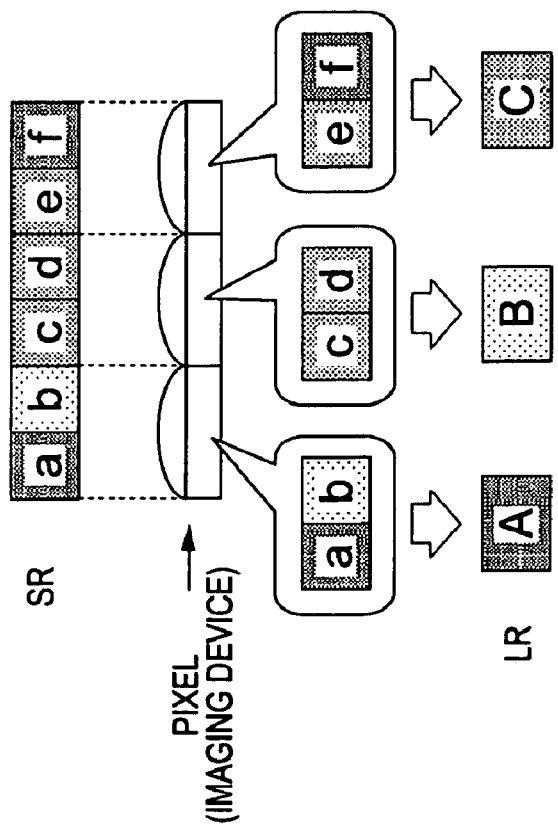
Figure 2:
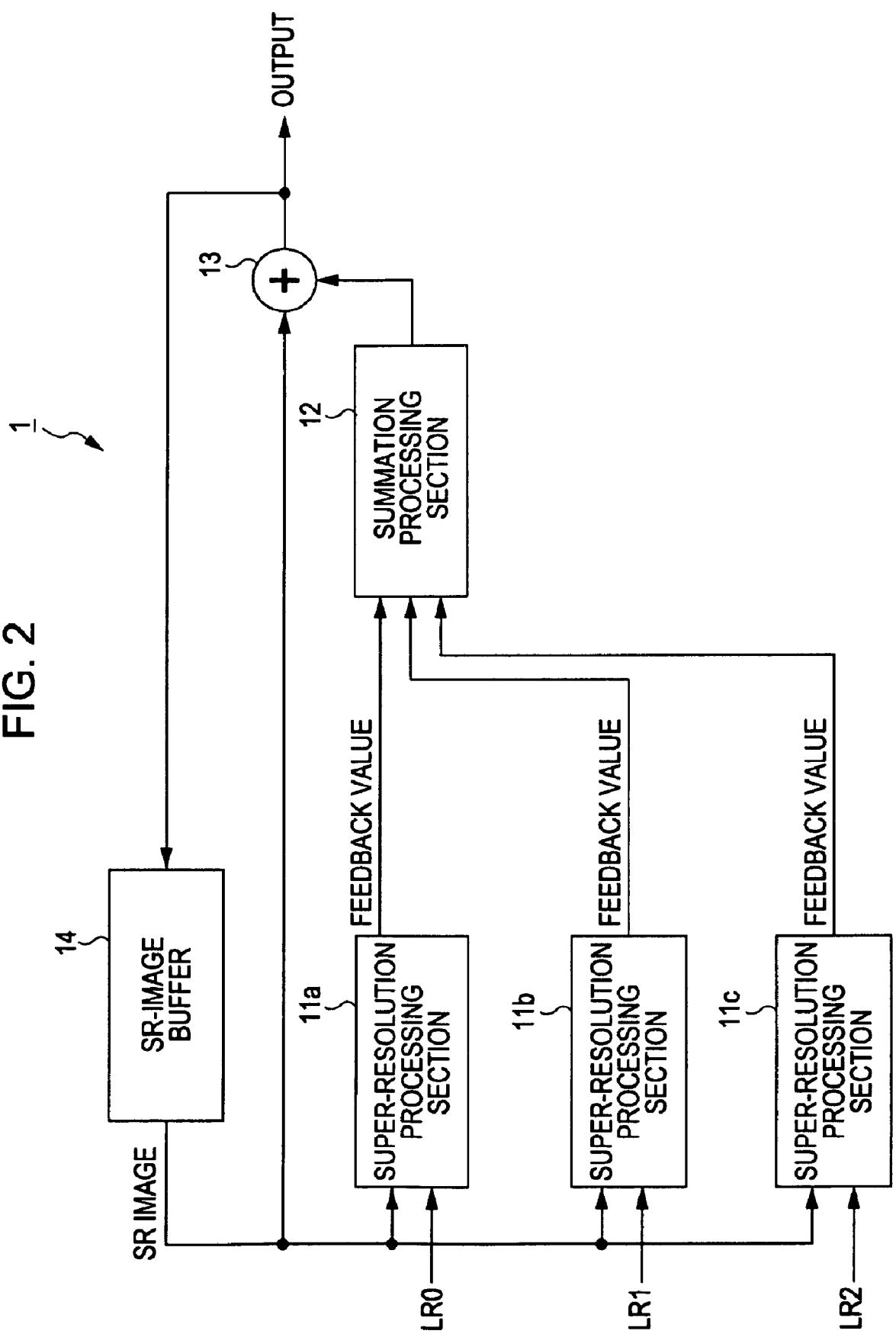
FIG. 2 is a diagram illustrating an example of a configuration in which super-resolution processing for generating a high-resolution image from low-resolution images is performed.
Figure 3:
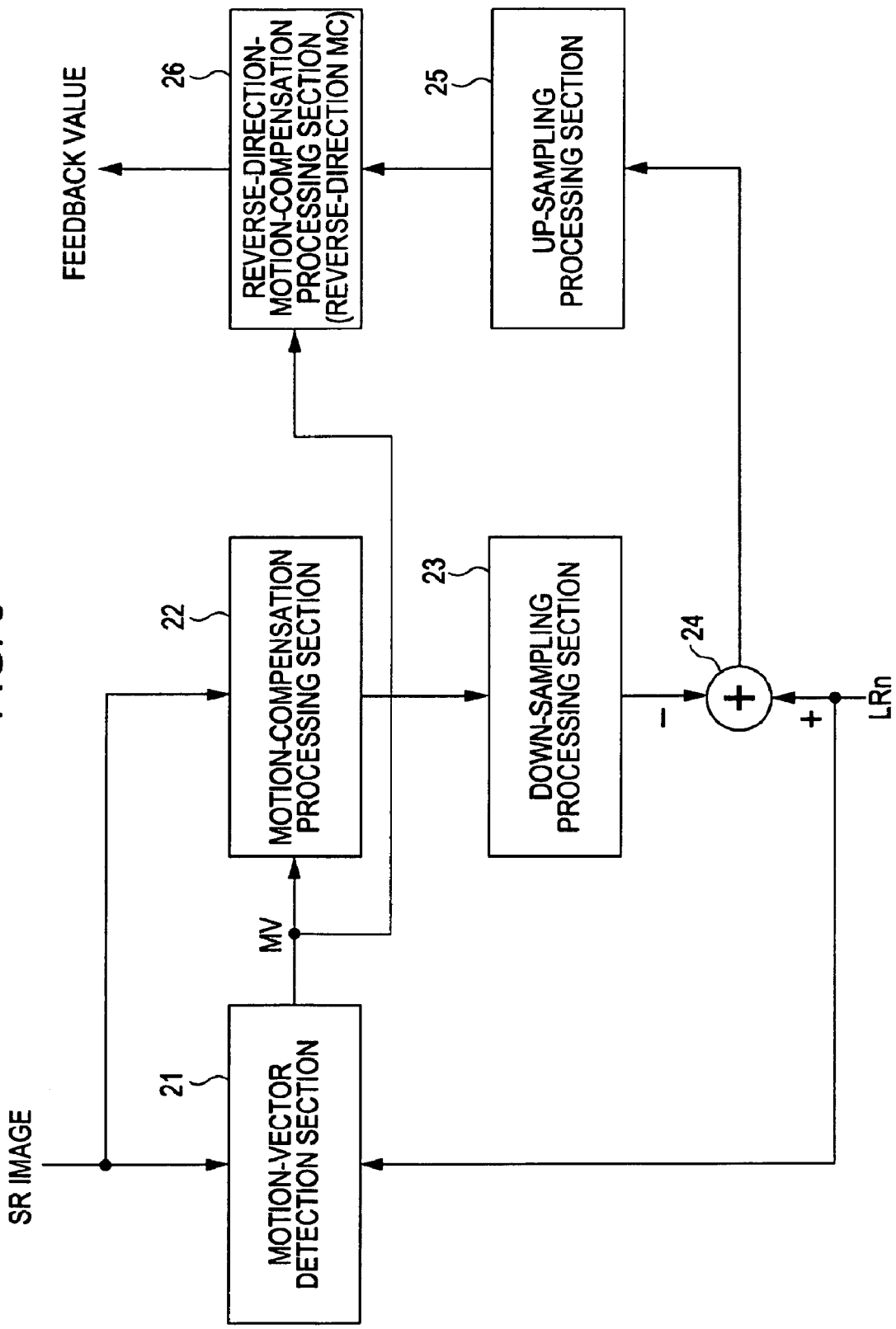
FIG. 3 is a diagram illustrating an example of a configuration in which super-resolution processing for generating a high-resolution image from low-resolution images is performed.
Figure 4A:
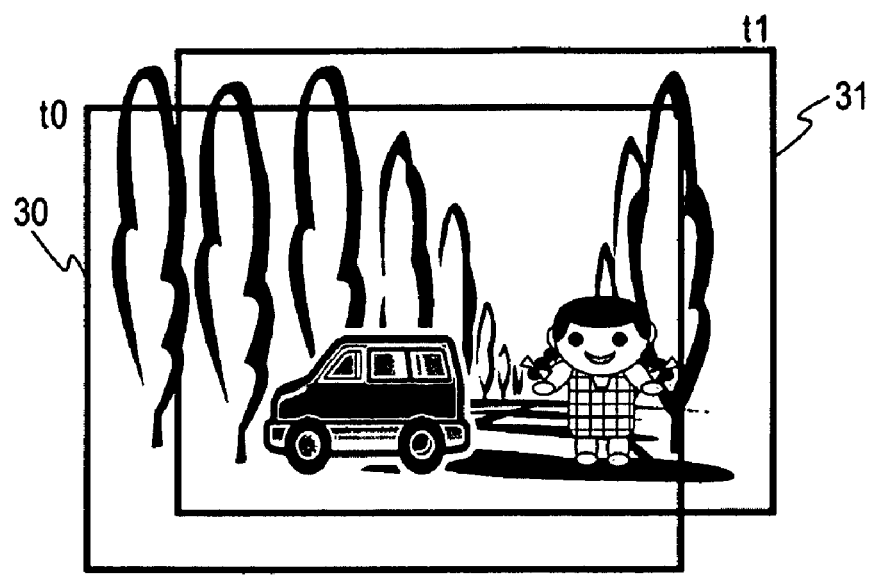
FIG. 4 is a diagram illustrating a global motion vector (GMV)

A description will be given of the global motion vector (GMV) with reference to FIG. 4. For example, as shown in FIG. 4A, it is assumed that there are two image frames 30 and 31 shot at time t0 and t1, respectively. The two frames are the frames shot when the camera is moved, for example, with being panned, tilted, camera shaken, etc., and thus the captured image is totally moved as shown in the figure.

Figure 4B:
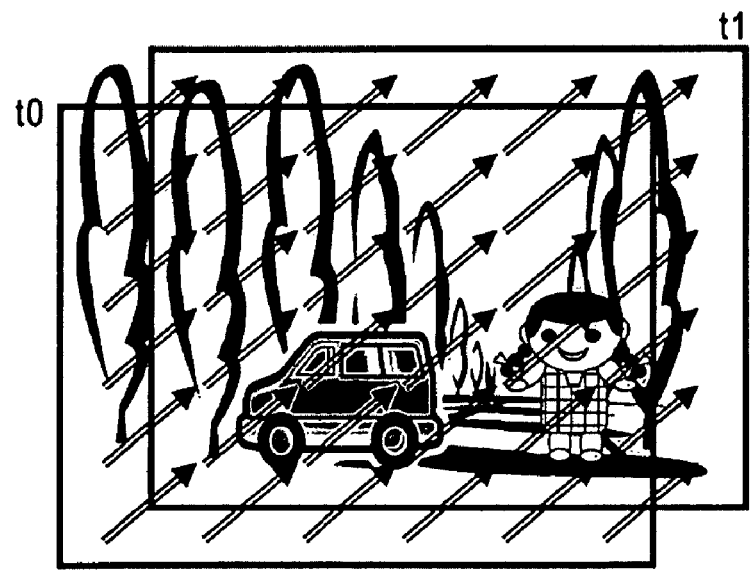

When such an image is coded, the processing has been performed to date in such a way that each frame is divided into a plurality of blocks, for example, n pixels×n pixels, a motion vector (MV) for each block, that is to say, a local motion vector (LMV), is detected, and then processing using each motion vector for each block is performed. However, when a camera is moved, for example, by panning, tilting, camera shake, etc., the motion vector of each block becomes substantially the same as shown in FIG. 4B.

Figure 4C:
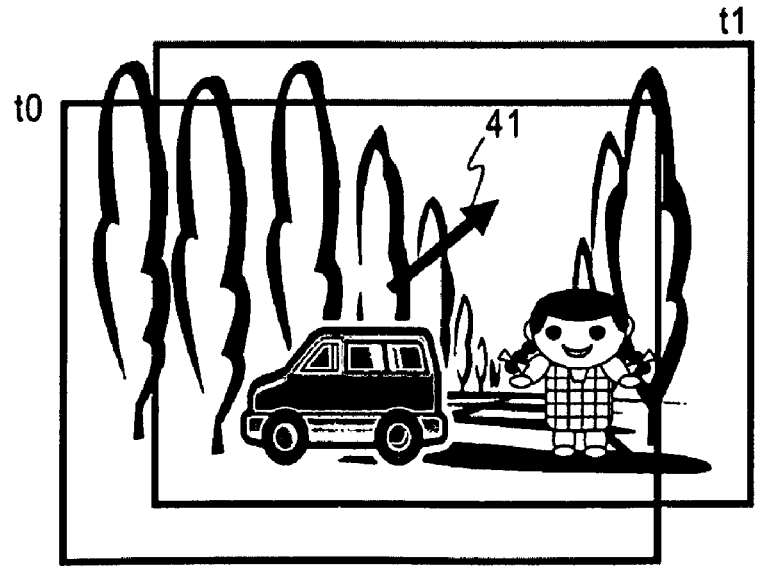

In such a case, it is possible to drastically improve coding efficiency by performing image coding using one motion vector 41 expressing the motion of the entire screen as shown in FIG. 4C, that is to say, a global motion vector (GMV).

For example, in MPEG-4, a method of coding an image by applying a global motion vector (GMV) and using global motion compensation (GMC) is adopted as a standard. Thus, a global motion vector (GMV) is detected at an encoder side, and reconstruction by global motion compensation (GMC) is performed using the transmitted global motion vector (GMV) at a decoder side.

In addition to a simple translation as shown in the figure, a global motion vector (GMV) can be expressed as data with rotation, enlargement, contraction, affine transformation, and projection transformation using a plurality of parameters.

As shown in FIG. 5, by the global motion vector (GMV), a relationship between the similar pixel positions (x, y) and (x', y') corresponding to the current frame and the reference frame, respectively, is expressed as data using translation, rotation, enlargement, contraction, affine transformation, projection transformation, etc. In general, one global motion vector (GMV) is applied to one image frame. In this regard, for example, a screen may be divided into blocks having a larger size than a usual block size, and a global motion vector (GMV) may be set for each of the blocks. That is to say, a global motion vector (GMV) is not limited to one for an image frame, one global motion vector (GMV) may be set as a common motion vector to a plurality of blocks included in an image frame, and a plurality of global motion vectors (GMVs) may be set for one frame.

When a global motion vector (GMV) is a vector indicating, for example, only translation (translation movement), the global motion vector (GMV) is expressed as follows using two parameters $[a_0, a_1]$.

$$x' = x + a_0$$

$$y' = y + a_1$$

A global motion vector (GMV) in consideration of translation (translation movement) and rotation is expressed as follows using three parameters $[a_0, a_1, a_2]$.

$$x' = \sin a_0 x - \cos a_0 y + a_2$$

$$y' = \cos a_0 x + \sin a_0 y + a_3$$

A global motion vector (GMV) corresponding to affine transformation is expressed as follows using six parameters $[a_0, a_1, a_2, a_3, a_4, a_5]$.

$$x' = a_0 x - a_1 y + a_2$$

$$y' = a_3 x + a_4 y + a_5$$

A global motion vector (GMV) corresponding to projection transformation is expressed as follows using eight parameters $[a_0, a_1, a_2, a_3, a_4, a_5, a_6, a_7]$.

$$x' = ((a_0 x + a_1 y + a_2)/(a_6 x + a_7 y + 1))$$

$$y' = ((a_3 x + a_4 y + a_5)/(a_6 x + a_7 y + 1))$$

In this regard, when a global motion vector (GMV) is obtained from moving-image frames, as shown in FIG. 5, verification processing of the pixel movement state among frames is performed by calculating a position relationship of the corresponding pixels from two frames, that is to say, the current frame and the reference frame, by, for example block matching, etc.

When a motion compensation image (MC image) is generated in the above-described super-resolution processing or the other image coding processing, the processing using the above-described global motion vector (GMV) is performed. Before describing the processing of the present invention, a description will be given of an example of general motion-compensation-image (MC image) generation processing with reference to FIG. 6.

FIG. 6 is a diagram illustrating an example of general generation processing of a motion compensation (MC image) on the basis of a global motion vector (GMV) in consideration of translation (translation movement) and rotation. As described above, a global motion vector (GMV) in consideration of translation (translation movement) and rotation is expressed using three parameters $[a_0, a_1, a_2]$ as follows.

$$x' = \sin a_0 x - \cos a_0 y + a_2$$

$$y' = \cos a_0 x + \sin a_0 y + a_3$$

Figure 6B:
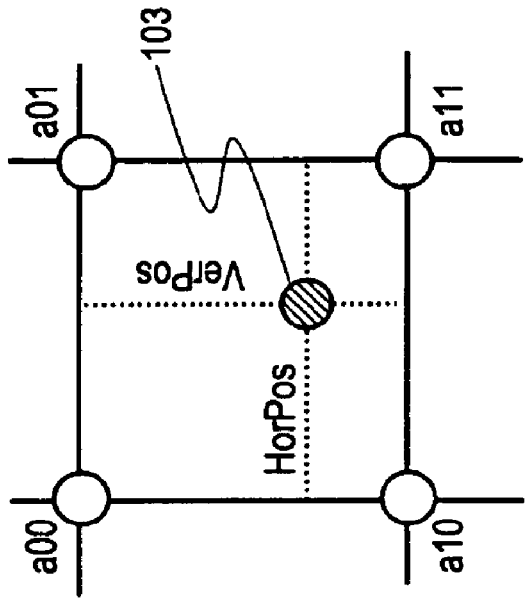
FIGS. 6A and 6B are diagrams illustrating an example of generation processing of a motion compensation (MC) image.
Figure 6A:
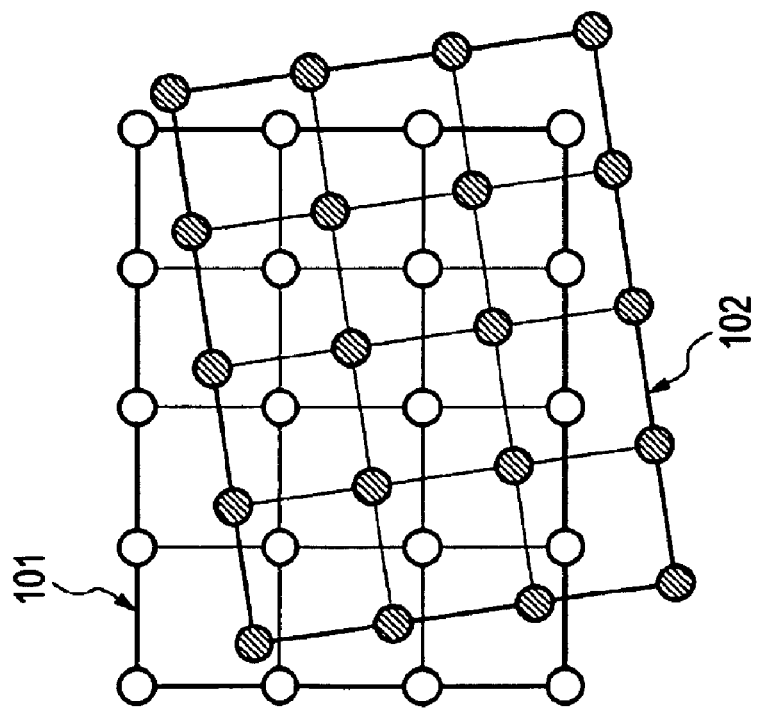

The original image used for generating a motion compensation image (MC image) 102 shown in FIG. 6A is assumed to be a reference image 101. In this regard, the global motion vector (GMV) is detected on the basis of the reference image 101 and the current frame image not shown-in the figure, and the global motion vector (GMV) thereof is the vector (GMV) expressed using the above-described three parameters $[a_0, a_1, a_2]$.

The image produced by moving the pixel position of the reference image 101 in accordance with the global motion vector (GMV) to match the pixel of the reference image 101 substantially to the pixel position of the current frame image not shown in the figure is the motion compensation image (MC image) 102 shown in FIG. 6A.

A general processing procedure for generating the motion compensation image (MC image) 102 expressed by a black circle from the reference image 101 expressed by a white circle in FIG. 6A includes the processing of the following steps 1 to 4.

Step 1: Calculate a relative position between the motion compensation image (MC image) 102 and the reference image 101.

Step 2: Determine a reference destination pixel Pixel of the reference image 101 at the time of creating the pixel (MC image Pixel) of the reference image 101 on the basis of the reference position calculated in step 1.

Step 3: Calculate a relative position (relative positions in the horizontal direction and in the vertical direction) with precision of a sub-pixel which is smaller than the original pixel width on the basis of the relative position.

Step 4: Calculate the pixel value of the motion compensation image (MC image) by a weighted average from the horizontal-direction and vertical-direction relative positions with sub-pixel precision.

In this regard, it is not necessary to calculate a weighted average for calculating the pixel value of the motion compensation image (MC image) 102. For example, if calculation cost is permitted, the pixel may be created using a filtering operation by further referencing the surrounding pixels.

A description will be given of a specific example of the processing with reference to FIG. 6B. When determining the pixel value of the MC image pixel 103, which is a pixel of the motion compensation image (MC image), pixels a00, a01, a10, and all of the original reference image are determined to be reference destination pixels by the above-described steps 1 and 2.

Next, in the above-described step 3, for the horizontal-direction and vertical-direction relative positions with sub-pixel precision, Horizontal-direction relative position [HorPos] and
Vertical-direction relative position [VerPos],
shown in FIG. 6B, are calculated.

Next, as processing for step 4, the pixel value [output_pixel] of the motion compensation image (MC image) 102 is calculated by a weighted average by applying the horizontal-direction relative position [HorPos] and vertical-direction relative position [VerPos] using the following expression (Expression 2).

output_pixel=(a00×(1−HorPos)+a01×HorPos)×(1−VerPos)+(a10×(1−HorPos)+a11×HorPos)×VerPos   (Expression 2)

However, a relative position between each pixel constituting the motion compensation image (MC image) 102 and the corresponding reference pixel in the reference image 101 is different, and thus it is necessary to calculate a relative position for each pixel of the motion compensation image (MC image) 102, resulting in huge calculation cost and processing time. Also, the data of the relative positions in the horizontal direction and in the vertical direction with precision of a sub-pixel:

Horizontal-direction relative position [HorPos] and
Vertical-direction relative position [VerPos]
are different for each pixel. Accordingly, it is necessary to calculate these values for each pixel, thereby resulting in huge calculation cost and processing time.

In this manner, an image processing apparatus of the present invention achieves efficient and high-speed generation processing of a motion compensation image (MC image), which is considered to be high-calculation-cost processing in general. In the following, a detailed description will be given of the generation processing of a motion compensation image (MC image) of the present invention.

As described with reference to FIG. 4, etc., a global motion vector (GMV) is a motion vector set in common with a plurality of blocks, for example, one motion vector in common with all the blocks constituting an image frame. When a global motion vector (GMV) is used, the constituent pixels of one frame are determined to move substantially in the same manner. Accordingly, for example, the relative positions in the horizontal direction and in the vertical direction with precision of a sub-pixel, which are necessary for generating the motion compensation image (MC image) shown in FIG. 6A:

Horizontal-direction relative position [HorPos] and
Vertical-direction relative position [VerPos]
have a strong correlation in spatial direction. A method of the present invention improves a calculation speed using the correlation in the spatial direction.

In the same manner as FIG. 6A, FIG. 7 illustrates the reference image 201 and the motion compensation image (MC image) 202 generated on the basis of the reference image 201 using the global motion vector (GMV). The relative positions between, for example, one pixel a among the constituent pixels of the motion compensation image (MC image) 202 shown in FIG. 7, and the eight surrounding pixels adjacent to a, that is to say, b, c, d, e, f, g, h, and i, and the reference pixel necessary for calculating the individual pixel values are substantially the same. The values of the relative positions in the horizontal direction and in the vertical direction with precision of a sub-pixel:

Horizontal-direction relative position [HorPos] and
Vertical-direction relative position [VerPos]
become substantially common values. A method of the present invention improves a calculation speed using the correlation in the spatial direction.

First Embodiment

A detailed description will be given of generation processing of a motion compensation image (MC image) according to a first embodiment of the present invention with reference to FIGS. 8 to 11. FIG. 8 illustrates an example of a configuration of motion-compensation-image (MC image) generation means set in an image processing apparatus of the present invention.

An input is a global motion vector (GMV) and a reference image, and an output is a motion compensation image (MC image) produced by changing pixel positions of the reference image in accordance with the global motion vector (GMV). In this regard, the global motion vector (GMV) is a global motion vector (GMV) generated, for example, on the basis of the current frame image and the reference frame image. The output motion compensation image (MC image) is an image produced by changing a pixel position of the reference image to a position corresponding to the pixel position of the current frame image.

As shown in FIG. 8, the motion-compensation-image (MC image) generation means set in the image processing apparatus of the present embodiment has a reference-pixel-relative-position calculation section 251, a relative-position quantization section 252, and a motion-compensation-image generation section 253.

The reference-pixel-relative-position calculation section 251 calculates at which point on the reference image a pixel necessary for generating a motion-compensation-image (MC image) is located on the basis of the global motion vector (GMV), which is input from the outside.

Figure 9:
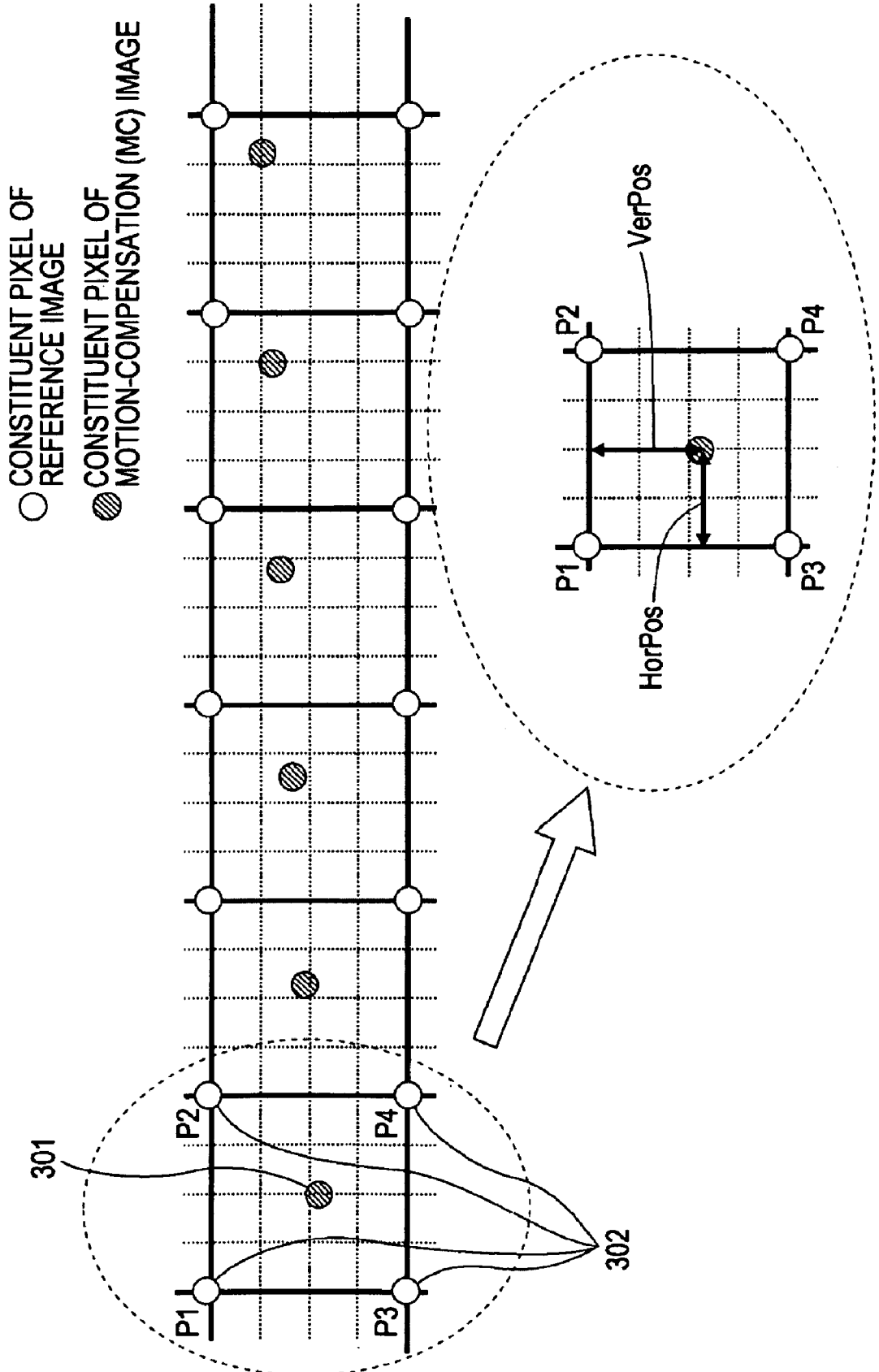
FIG. 9 is a diagram illustrating details of motion-compensation (MC) image generation processing according to an embodiment of the present invention.

A description will be given of processing performed by the reference-pixel-relative-position calculation section 251 with reference to FIG. 9. In the same manner as the reference image 201 and the motion compensation image (MC image) 202 shown in FIG. 7, in FIG. 9, a white circle denotes a constituent pixel of the reference image, and a black circle denotes a constituent pixel of the motion compensation image (MC image). For example, when the pixel value of the constituent pixel of the motion compensation image (MC image) 301 is determined, in the same manner as described with reference to FIG. 6B before, the pixel value of the constituent pixel of the reference image surrounding the motion compensation image (MC-image) 301 shown in FIG. 9 is referenced. That is to say, four pixels, reference pixels P1 to P4, shown in FIG. 9, become reference pixels 302.

The reference-pixel-relative-position calculation section 251 calculates, for example, as the reference-pixel relative position of the reference image of the constituent pixel 301 of the motion compensation image (MC image), the relative positions in the horizontal direction and in the vertical direction with precision of a sub-pixel as shown in FIG. 9:

Horizontal-direction relative position [HorPos] and
Vertical-direction relative position [VerPos].

The reference-pixel-relative-position calculation section 251 calculates the relative positions in the horizontal direction and in the vertical direction with precision of a sub-pixel for each constituent pixel of the motion compensation image (MC image), and outputs them to the relative-position quantization section 252.

The relative-position quantization section 252 receives the input of the relative position information of the reference pixel corresponding to each constituent pixel of the motion compensation image (MC image) from the reference-pixel-relative-position calculation section 251, and quantizes these. That is to say, the relative-position quantization section 252 quantizes the relative position information of the reference pixel with a preset precision, and outputs the quantized relative position information of the reference pixel to the motion-compensation-image generation section 253.

Figure 10:
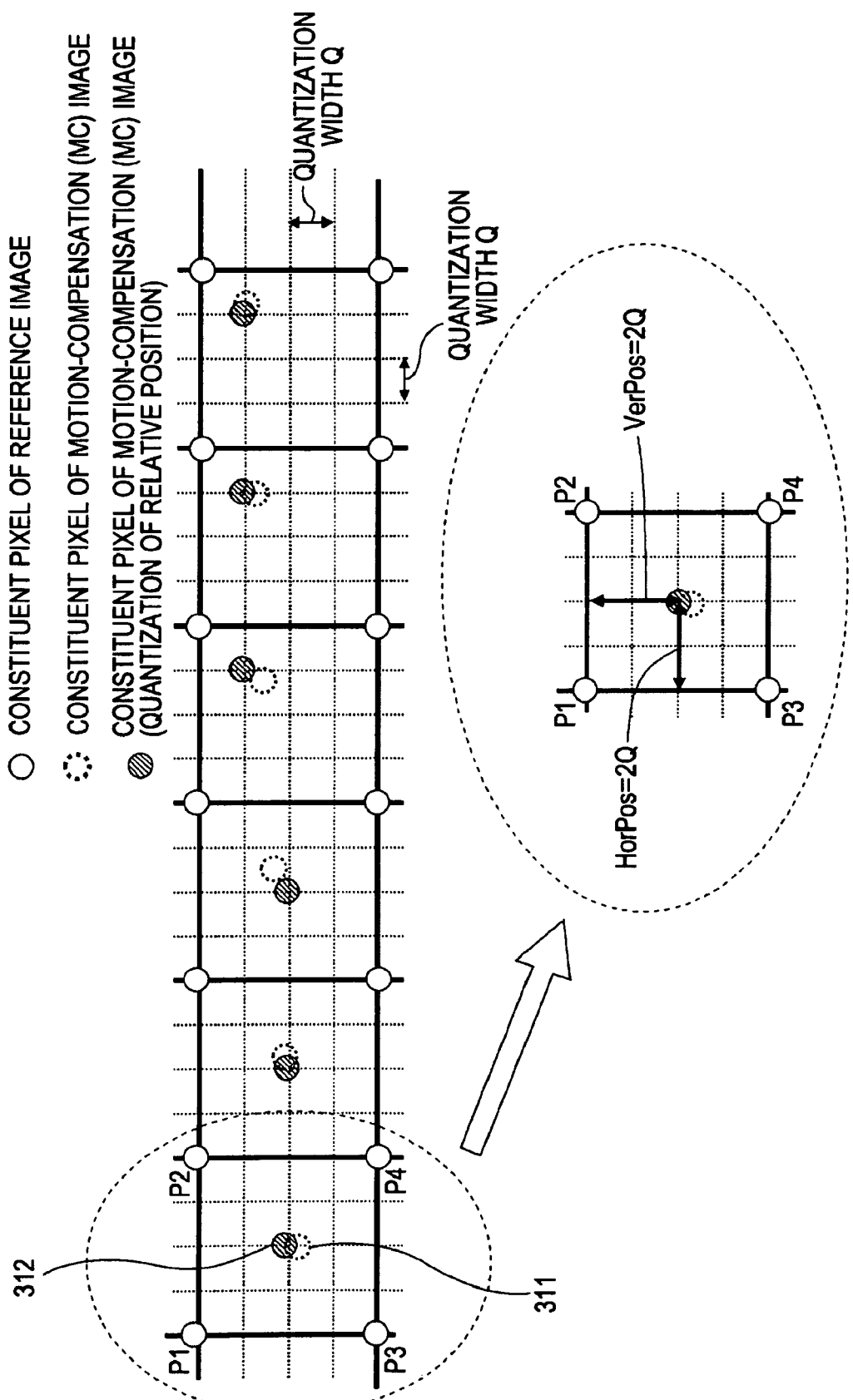
FIG. 10 is a diagram illustrating details of motion-compensation (MC) image generation processing according to an embodiment of the present invention.

A description will be given of the processing executed by the relative-position quantization section 252 with reference to FIG. 10. In FIG. 10, a white circle denotes a constituent pixel of a reference image, and a white dotted-line circle denotes a constituent pixel of the motion compensation image (MC image) (the same as the black circle in FIG. 9). In addition to these pixel positions, the constituent pixel of the motion compensation image (MC image) that is obtained by quantizing the relative position of a reference pixel is denoted by a black circle.

That is to say, the relative-position quantization section 252 receives the input of information on the relative positions in the horizontal direction and in the vertical direction with precision of a sub-pixel for each constituent pixel of the motion compensation image (MC image):

Horizontal-direction relative position [HorPos] and
Vertical-direction relative position [VerPos], and
quantizes the relative position information with a preset precision.

In the example shown in FIG. 10, a quantization width (step) Q is set to ¼ of one-pixel width.
That is to say, the quantization width (step) Q=¼pel
where pel is a pixel width.

In this regard, the quantization width (step) Q shown in FIG. 10 is an example, and various settings, such as the quantization width Q=1pel, ½pel, etc., are possible.

In the example shown in FIG. 10, for example, after the quantization of the reference position, the constituent pixel 311 of the motion compensation image (MC image) before quantization is determined to be at the position of the constituent pixel 312 of the motion compensation image (MC image) after quantization. As shown in a lower right figure in FIG. 10, the relative positions between the constituent pixel 312 of the motion compensation image (MC image) and the reference pixel in the horizontal direction and in the vertical direction are transformed into quantized information using the quantization width Q as follows.

Horizontal-direction relative position [HorPos]=2Q and
Vertical-direction relative position [VerPos]=2Q The relative-position quantization section 252 quantizes the relative positions between all the constituent pixels of the motion compensation image (MC image) and the reference pixel in the horizontal direction and in the vertical direction, and outputs the quantized-relative-position information to the motion-compensation-image generation section 253.

The motion-compensation-image generation section 253 receives input of the quantized-relative-position information from the relative-position quantization section 252, further receives the reference image as the original image of the motion compensation image (MC image), and generates a motion compensation image (MC image) on the basis of the input information.

A description will be given of generation processing of the motion compensation image (MC image) in the motion-compensation-image generation section 253 with reference to FIG. 11. The motion-compensation-image generation section 253 groups together the constituent pixels of the motion compensation image (MC image) having the same quantized-relative-position information input from the relative-position quantization section 252, and performs pixel-value calculation processing to generate the motion compensation image (MC image).

Figure 11:
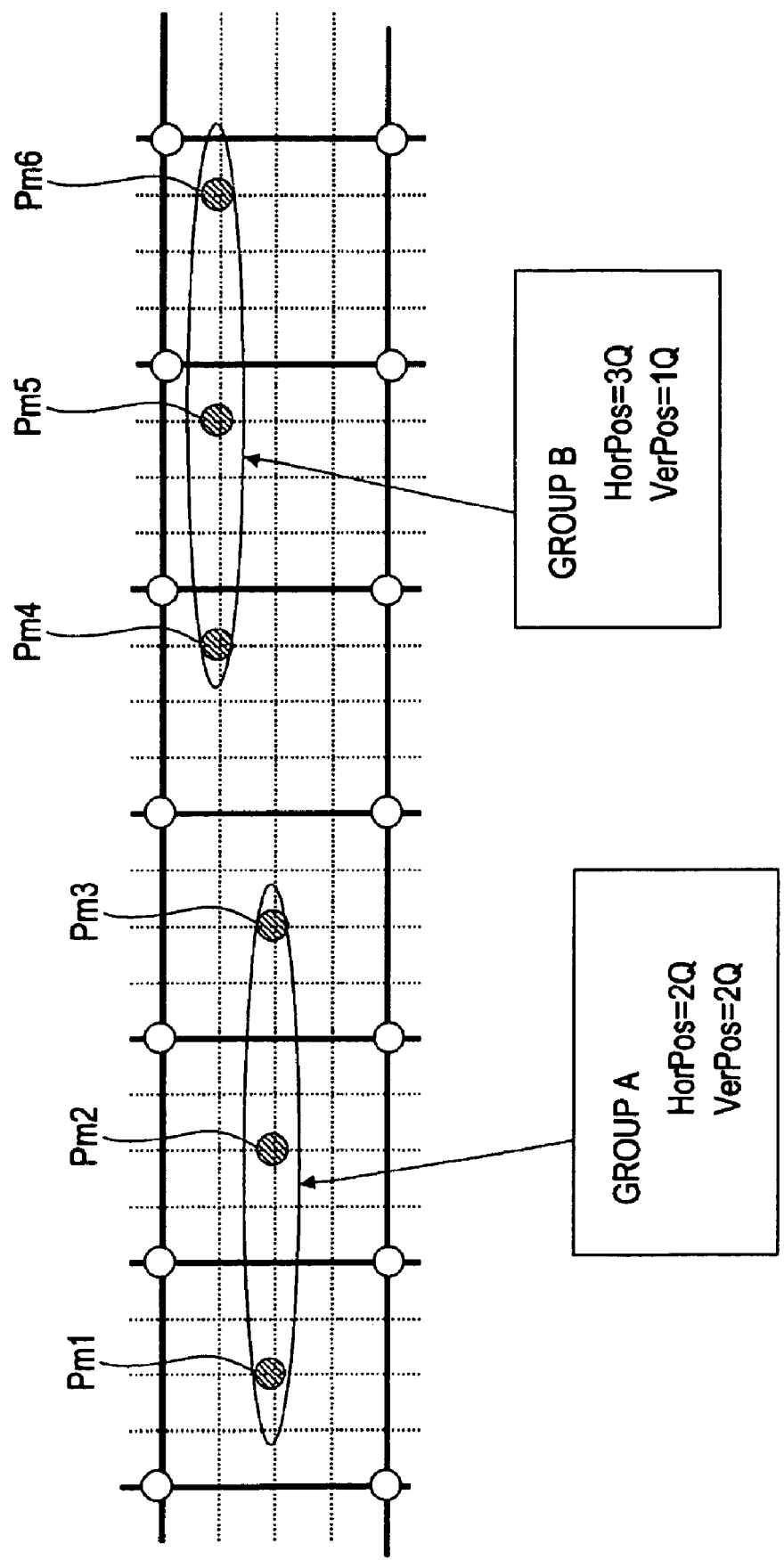
FIG. 11 is a diagram illustrating details of motion-compensation (MC) image generation processing according to an embodiment of the present invention.

In the example shown in FIG. 11, the constituent pixels Pm1 to Pm6 of the motion compensation image (MC image) after the quantization of relative positions are shown. In these pixels, Pm1 to Pm3 have the same quantized-relative-position information as follows.

Horizontal-direction relative position [HorPos]=2Q and
Vertical-direction relative position [VerPos]=2Q.

Accordingly, the constituent pixels Pm1 to Pm3 of the motion compensation image (MC image) are grouped together into one group (group A).

In the same manner, the constituent pixels Pm4 to Pm6 of the motion compensation image (MC image) after the quantization have the same quantized-relative-position information as follows.

Horizontal-direction relative position [HorPos]=3Q and
Vertical-direction relative position [VerPos]=1Q.

Accordingly, the constituent pixels Pm4 to Pm6 of the motion compensation image (MC image) are grouped together into one group (group B).

The motion-compensation-image generation section 253 performs the calculation of the pixel values of the constituent pixels of the motion compensation image (MC image) for each group. In the example shown in FIG. 11, the motion-compensation-image generation section 253 performs the processing on the three pixels of the group A and the three pixels of the group B. In this regard, as described above, the calculation processing of the pixel value (output_pixel) of each pixel is performed in accordance with the expression (2) described before, that is to say, by the following expression.

output_pixel=($a$00×(1−HorPos)+$a$01×HorPos)×(1−VerPos)+($a$10×(1−HorPos)+$a$11×HorPos)×VerPos To date, it has been necessary to calculate the pixel values by sequentially replacing the following values:
Horizontal-direction relative position [HorPos] and
Vertical-direction relative position [VerPos]
for each of the pixels. However, in this processing, it becomes possible to calculate the pixel values by applying the same quantized data to a plurality of pixels, and thus the calculation cost is drastically reduced to achieve high-speed processing.

Second Embodiment

Figure 12:
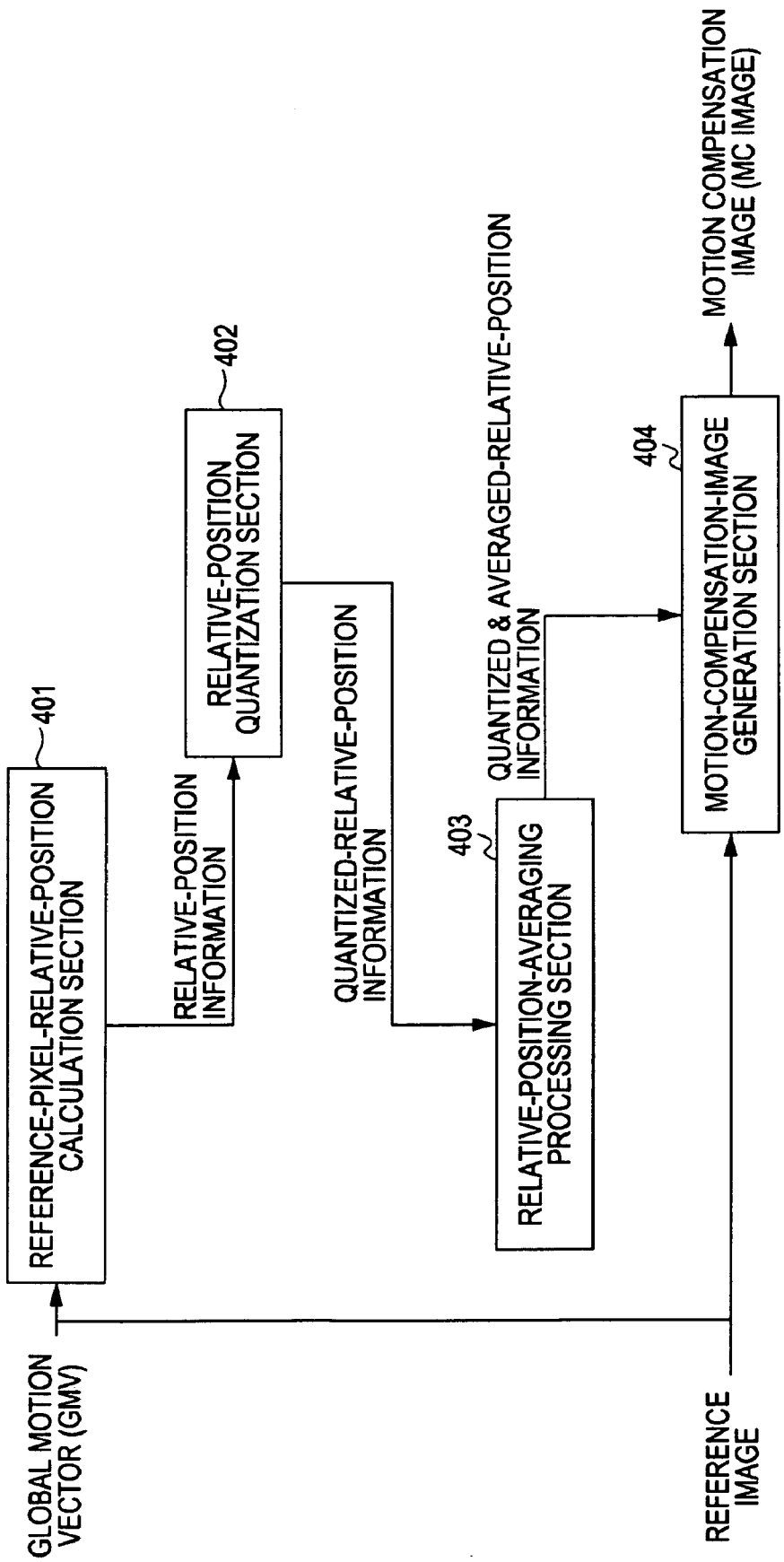
FIG. 12 is a diagram illustrating an example (second embodiment) of a configuration of motion-compensation (MC) image generation means set in an image processing apparatus of the present invention.

Next, a detailed description will be given of the generation processing of the motion compensation image (MC image) according to a second embodiment of the present invention with reference to FIGS. 12 and 13. FIG. 12 illustrates an example of a configuration of the motion-compensation (MC) image generation means of the present embodiment.

The motion-compensation (MC) image generation means shown in FIG. 12 has a configuration in which a relative-position-averaging processing section 403 is added to the configuration of the first embodiment described with reference to FIG. 8 before. A reference-pixel-relative-position calculation section 401 and a relative-position quantization section 402 perform the same processing as that in the first embodiment. A motion-compensation-image generation section 404 receives the input of the processing data from the relative-position-averaging processing section 403 to generate the motion compensation image (MC image).

In the same manner as the first embodiment described above, in the present embodiment, an input is a global motion vector (GMV) and a reference image, and an output is a motion compensation image (MC image) produced by changing pixel positions of the reference image in accordance with the global motion vector (GMV). In this regard, the global motion vector (GMV) is a global motion vector (GMV) generated, for example, on the basis of the current frame image and the reference frame image. The output motion compensation image (MC image) is an image produced by changing a pixel position of the reference image to a position corresponding to the pixel position of the current frame image.

In the configuration shown in FIG. 12, the reference-pixel-relative-position calculation section 401 calculates at which point on the reference image a pixel necessary for generating a motion-compensation image (MC image) is located on the basis of the global motion vector (GMV), which is input from the outside. This processing is the processing described before with reference to FIG. 9.

The relative-position quantization section 402 receives the input of the relative position information of the reference pixel corresponding to each constituent pixel of the motion compensation image (MC image) from the reference-pixel-relative-position calculation section 401, and quantizes these. That is to say, the relative-position quantization section 402 quantizes the relative position information of the reference pixel with a preset precision. This processing is the processing described before with reference to FIG. 10. The relative-position quantization section 402 outputs the quantized relative position information of the reference pixel to the relative-position-averaging processing section 403.

The relative-position-averaging processing section 403 performs averaging processing on the input information from the relative-position quantization section 402, that is to say, the relative position information of the quantized reference pixel corresponding to each constituent pixel of the motion compensation image (MC image), specifically,
Horizontal-direction relative position [HorPos]=nQ and
Vertical-direction relative position [VerPos]=mQ for each preset number of pixels.

For example, the relative-position-averaging processing section 403 performs averaging processing on the quantized information for each preset number of pixels corresponding to the calculation processing power of the SIMD (Single Instruction Multiple Data) processor, which is a calculation processing unit calculating the pixel values of the constituent pixels of the motion compensation image (MC image) in the image processing apparatus.

In general, the SIMD has a configuration for performing parallel calculation on input data of in units of 32 bits or 64 bits. For example, if the pixel value of one constituent pixel of the motion compensation image (MC image) is 8-bit data, it is possible to calculate a pixel value of four pixels, namely 4×8=32-bit data by the SIMD performing 32-bit data processing. Thus, it becomes possible to perform efficient operation by putting four pixels together. Thereby, high-speed processing is achieved.

Figure 13:
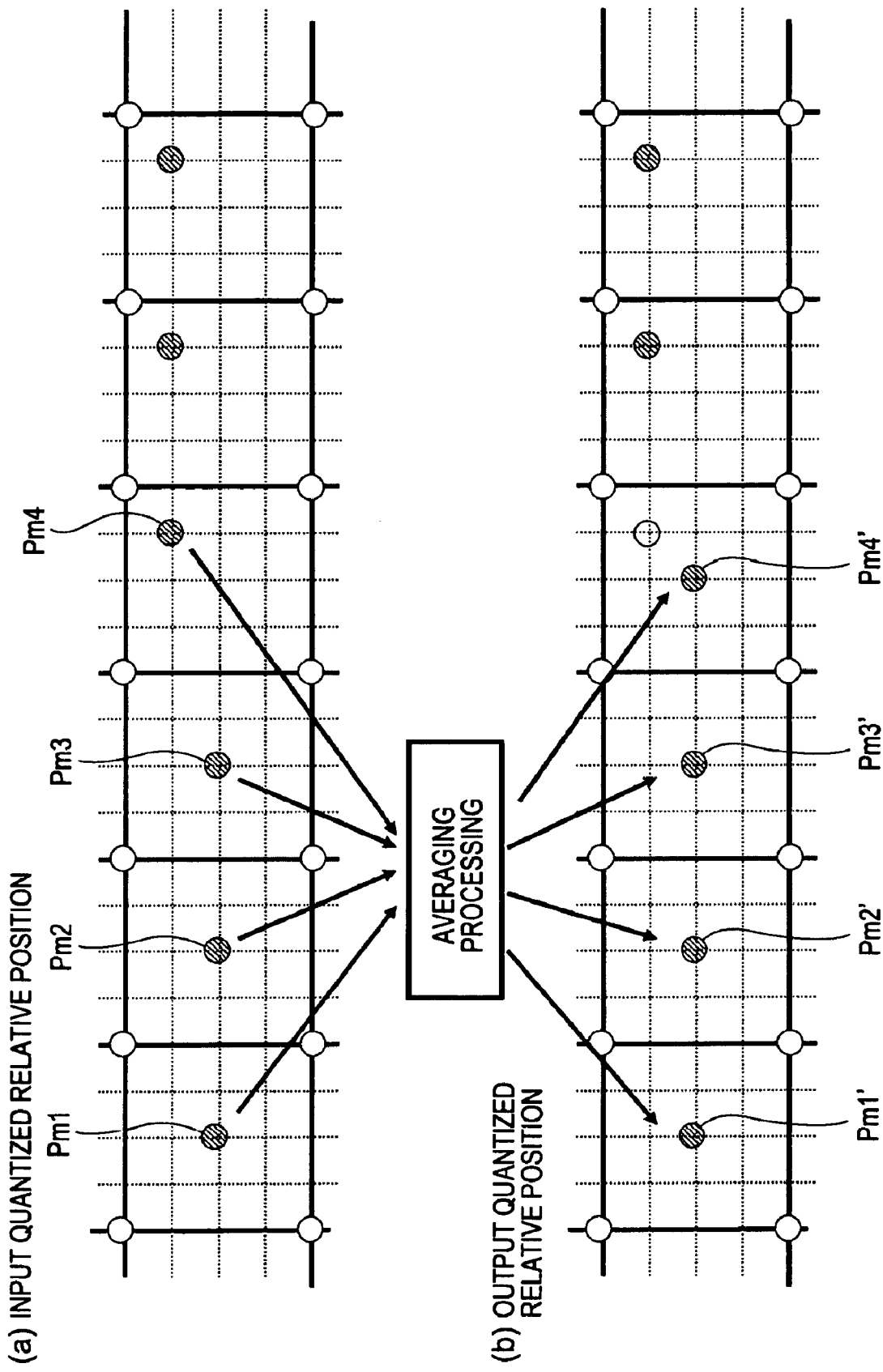
FIG. 13 is a diagram illustrating details of motion-compensation (MC) image generation processing according to an embodiment of the present invention.

As shown in FIG. 13, the relative-position-averaging processing section 403 performs averaging processing on the input information from the relative-position quantization section 402, that is to say, the quantized-relative-position information of the motion compensation image (MC image) for each four pixels (pm1 to pm4). In this regard, the output information is also quantized information.

In the example shown in FIG. 13, the quantized-relative-position information as the input information in FIG. 13(*a*), the pixels pm1 to pm3 have
Horizontal-direction relative position [HorPos]=2Q and
Vertical-direction relative position [VerPos]=2Q.
The pixel pm4 has
Horizontal-direction relative position [HorPos]=3Q and
Vertical-direction relative position [Verpos]=1Q.
In this case, the simple average of the quantized data becomes Horizontal-direction relative position [HorPos]=((2*Q*×3)+(3*Q*×1))/4=9*Q*/4 =2.25*Q* and Vertical-direction relative position [VerPos]=((2*Q*×3)+(1*Q*×1))/4=7*Q*/4=1.75*Q*.

Further, by quantizing the averaged data, the pixels pm1 to pm4 have
Horizontal-direction relative position [HorPos]=2Q and
Vertical-direction relative position (VerPos)=2Q.
The quantized-relative-position data are the pixels pm1' to pm4' having the same quantized position information shown in FIG. 13(*b*). These are put together into one group, and is output from the relative-position-averaging processing section 403 to the motion-compensation-image generation section 404.

In this regard, the processing described with reference to FIG. 13 is an example of the case where one pixel is 8-bit data, and the calculation of the pixel value of the motion compensation image (MC image) in the motion-compensation-image generation section 404 is performed by the 32-bit SIMD. For example, if one pixel is 8-bit data, and the calculation of the pixel value of the motion compensation image (MC image) in the motion-compensation-image generation section 404 is performed by the 64-bit SIMD, it is possible to set eight pixels to be a unit of parallel calculation. In this case, eight pixels are to be averaged.

In this regard, in the example in FIG. 13, four pixels in the horizontal direction are selected as the pixels to be averaged. However, it is possible to make various selections of the pixels to be averaged. For example, four pixels in the vertical direction may be selected.

The motion-compensation-image generation section 404 receives input of the averaged quantized-relative-position information for each plurality of pixels from the relative-position-averaging processing section 403, and calculates the pixel values of the constituent pixels of the motion compensation image (MC image).

The motion-compensation-image generation section 404 calculates the pixel value of each pixel using an SIMD (Single Instruction Multiple Date) processor, which is a calculation processing unit calculating the pixel values of the constituent pixels of the motion compensation image (MC image). As described above, for example, parallel calculation is performed on the input data in units of 32 bits to calculate the pixel values of four pixels in parallel. In this manner, high-speed processing is achieved by the calculation with a plurality of pixels being put together into one group.

Third Embodiment

Figure 14:
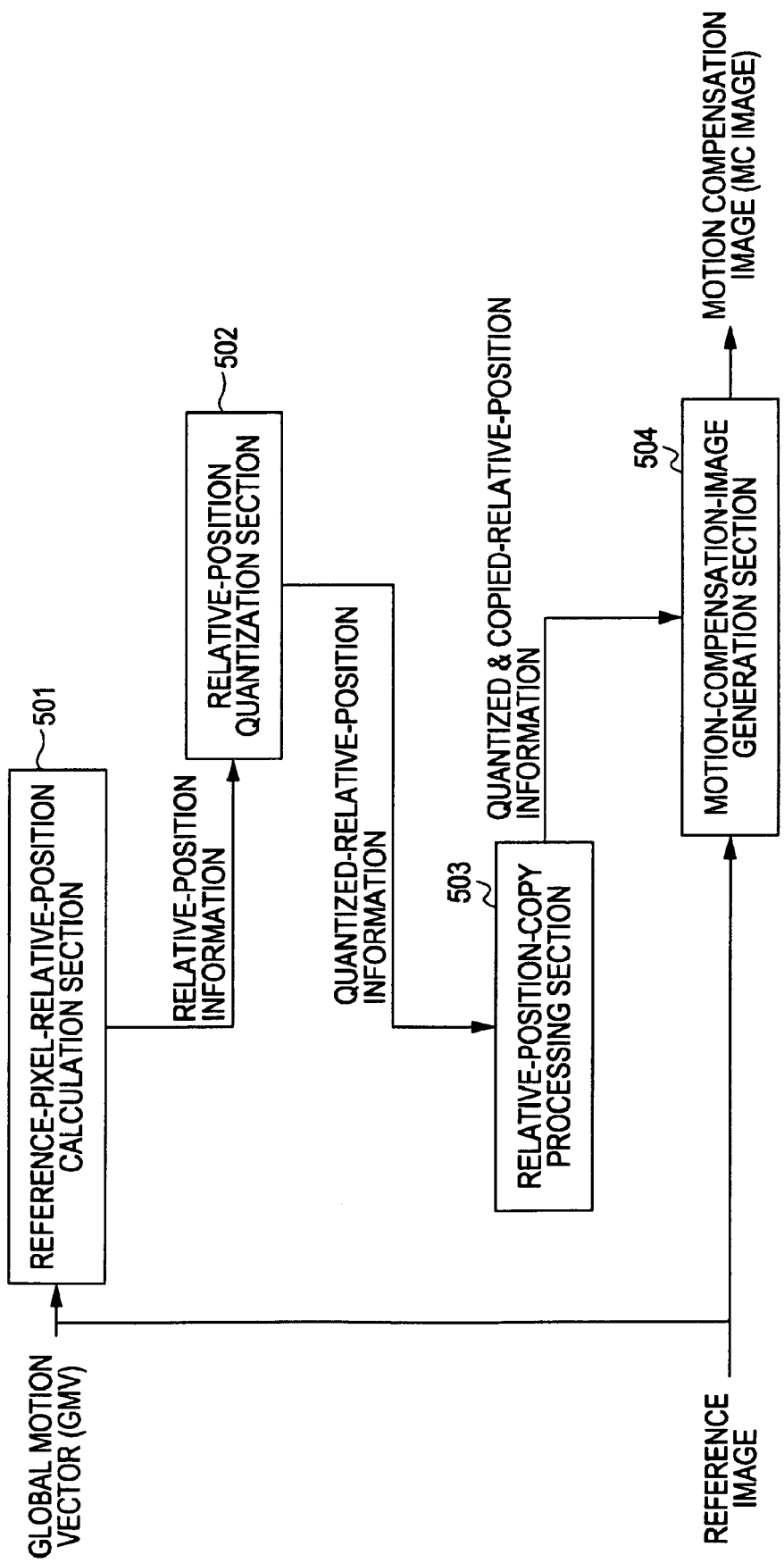
FIG. 14 is a diagram illustrating an example (third embodiment) of a configuration of motion-compensation (MC) image generation means set in an image processing apparatus of the present invention.
Figure 17:
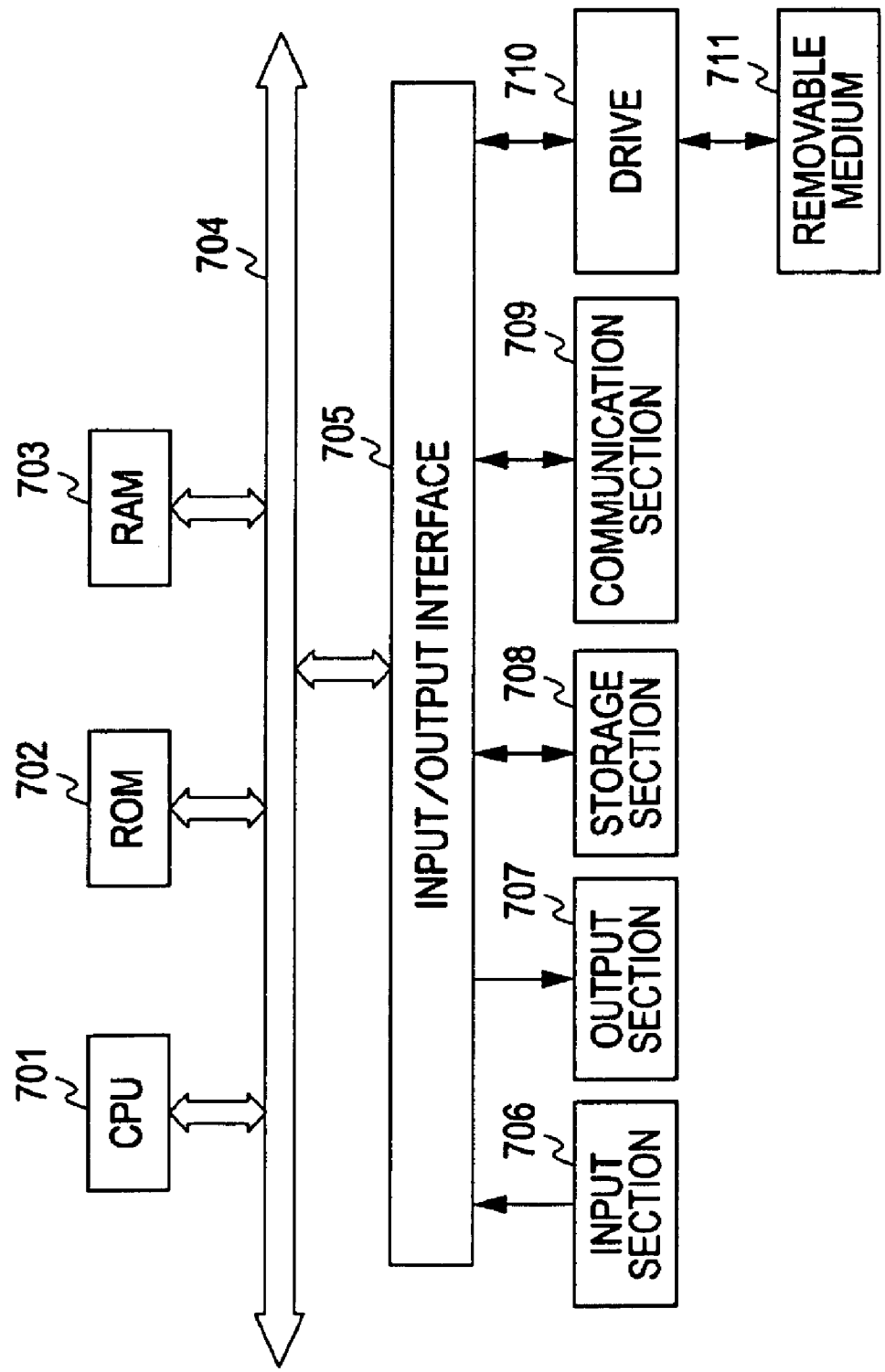
FIG. 17 is a diagram illustrating an example of a hardware configuration of an image processing apparatus according to an embodiment of the present invention.

Next, a detailed description will be given of the generation processing of the motion compensation image (MC image) according to a third embodiment of the present invention with reference to FIGS. 14 and 17. FIG. 14 illustrates an example of a configuration of the motion-compensation (MC) image generation means of the present embodiment.

The motion-compensation (MC) image generation means shown in FIG. 14 has a configuration in which a relative-position-copy processing section 503 is added to the configuration of the first embodiment described with reference to FIG. 8 before. A reference-pixel-relative-position calculation section 501 and a relative-position quantization section 502 perform the simplified processing of that in the first embodiment. The processing is not performed on all the constituent pixels of the motion compensation image (MC image). The simplified processing is performed by selecting processing pixels in part, for example, one pixel for each four pixels. A motion-compensation-image generation section 504 receives the input of the processing data from the relative-position-copy processing section 503 to generate the motion compensation image (MC image).

In the same manner as the first embodiment described above, in the present embodiment, an input is a global motion vector (GMV) and a reference image, and an output is a motion compensation image (MC image) produced by changing pixel positions of the reference image in accordance with the global motion vector (GMV). In this regard, the global motion vector (GMV) is a global motion vector (GMV) generated, for example, on the basis of the current frame image and the reference frame image. The output motion compensation image (MC image) is an image produced by changing a pixel position of the reference image to a position corresponding to the pixel position of the current frame image.

In the configuration shown in FIG. 14, the reference-pixel-relative-position calculation section 501 calculates at which point on the reference image a pixel necessary for generating a motion-compensation image (MC image) is located on the basis of the global motion vector (GMV), which is input from the outside. This processing is the processing described before with reference to FIG. 9. However, in this example of processing, the relative position information is not calculated for all the reference pixels of the constituent pixels of the motion compensation image (MC image). The processing is performed only for the preset selection pixels, and the relative position information is not calculated for non-selection pixels.

Figure 15:
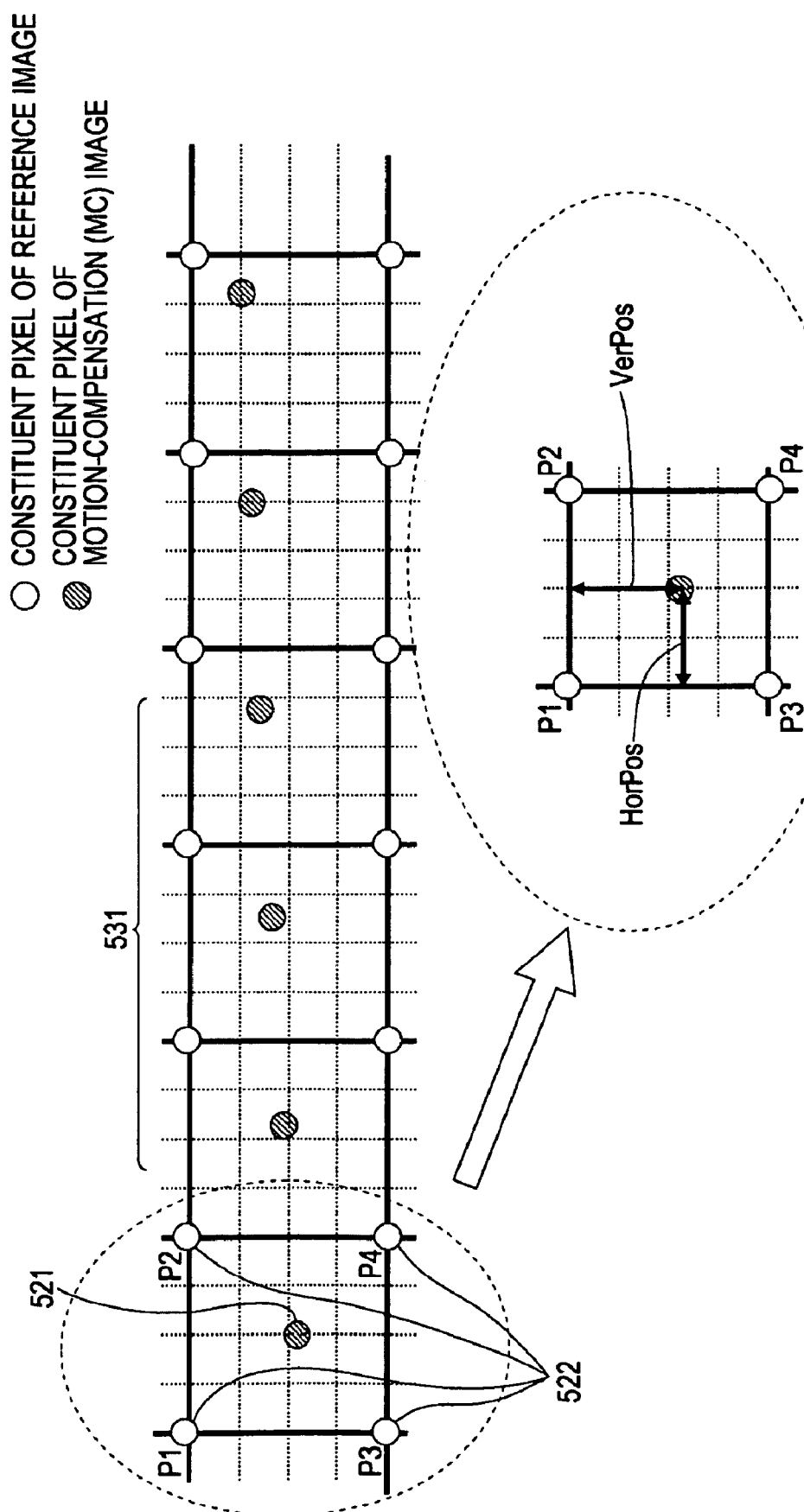
FIG. 15 is a diagram illustrating details of motion-compensation (MC) image generation processing according to an embodiment of the present invention.

For example, as shown in FIG. 15, only one pixel out of four pixels in the horizontal direction is selected as a processing pixel 521. For the processing pixel 521, the following relative-position information is calculated by the processing described before with reference to FIG. 9 as the relative position with respect to the reference pixel.

Horizontal-direction relative position [HorPos] and
Vertical-direction relative position [VerPos].

However, the relative-position information is not calculated for the three non-processing pixel 531 at the right side of that pixel. For the rest of the pixels, three consecutive pixel after one pixel from which the relative position is calculated, the relative positions are not calculated in the same manner.

That is to say, the reference-pixel-relative-position calculation section 501 calculates the relative positions for only one pixel out of the four pixels, thereby reducing the amount of processing to 25% compared with the first embodiment.

The relative-position quantization section 502 receives the input of the relative position information of the reference pixel corresponding to the processing pixels selected from the constituent pixels of the motion compensation image (MC image) from the reference-pixel-relative-position calculation section 501, and quantizes these. This processing is the processing described before with reference to FIG. 10. However, the pixels on which the quantization processing is performed are only the pixels whose relative positions have been calculated by the reference-pixel-relative-position calculation section 501. Only one pixel out of four pixels are those pixels in this embodiment. In the same manner as the reference-pixel-relative-position calculation section 501, the relative-position quantization section 502 calculates quantized relative positions only for one pixel out of four pixels, thereby reducing the amount of processing to 25% compared with the first embodiment. In this regard, in this example, the ratio of the processing pixels to the non-processing pixels is set to be 1:3. However, this setting is allowed to be in various ways.

The relative-position quantization section 502 outputs the quantized relative position information of the reference pixel to the relative-position-copy processing section 503.

The relative-position-copy processing section 503 performs sequential copy processing of the input information from the relative-position quantization section 502, that is to say, the relative position information of the quantized reference pixel corresponding to each processing pixel selected from the constituent pixels of the motion compensation image (MC image), specifically, Horizontal-direction relative position [HorPos]=nQ and
Vertical-direction relative position [VerPos]=mQ to non-processing pixels.

Figure 16:
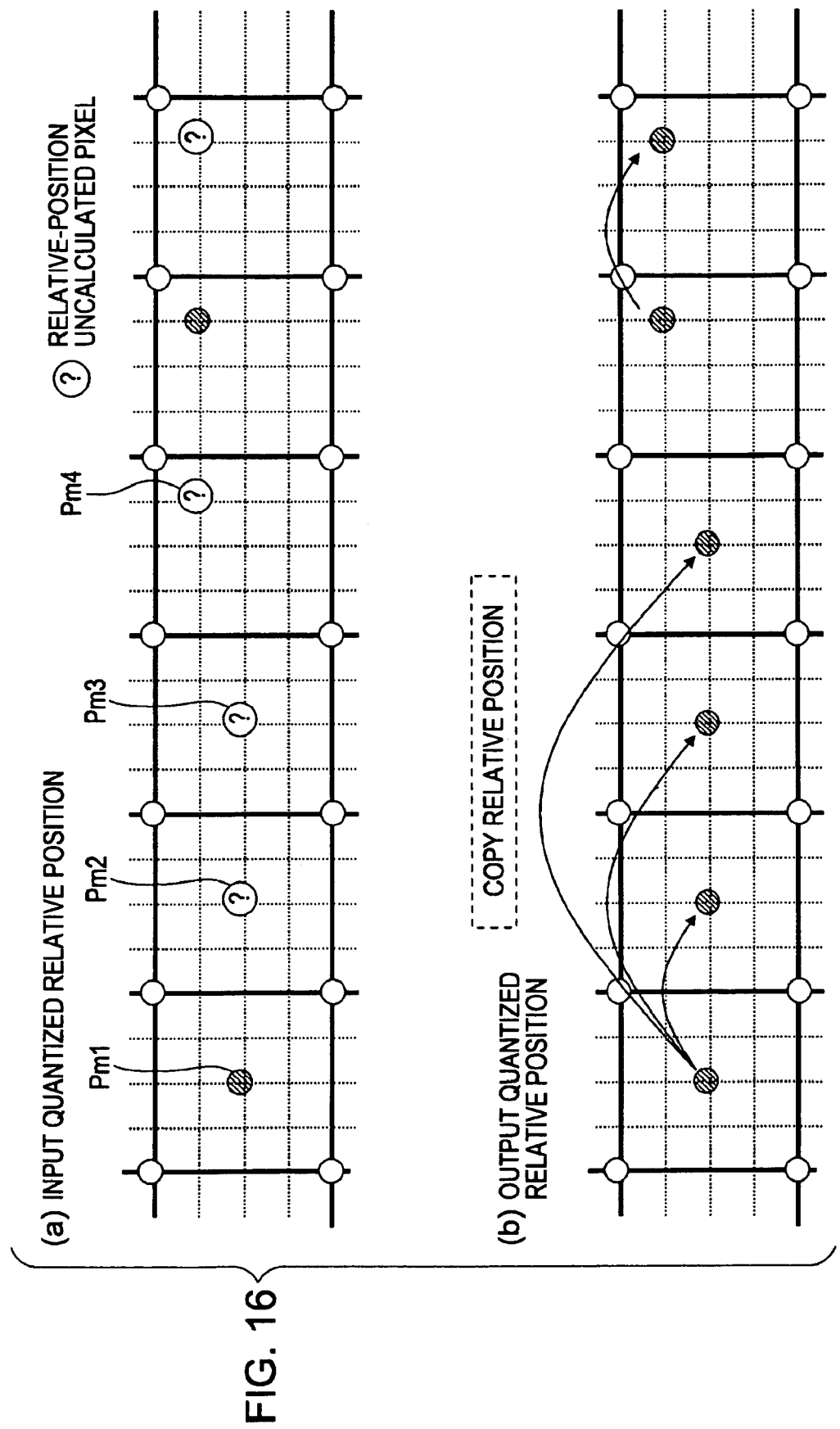
FIG. 16 is a diagram illustrating details of motion-compensation (MC) image generation processing according to an embodiment of the present invention.

As shown in FIG. 16, the input information from the relative-position quantization section 502 is the quantized relative position information of only the processing pixels partly selected from the constituent pixels of the motion compensation image (MC image). In the example in FIG. 16, a pixel pm1 is a processing pixel out of four pixels (pm1 to pm4), and pm2 to pm4 are non-processing pixels. In this case, the pixel pm1 has the quantized relative position information, namely, Horizontal-direction relative position [HorPos]=2Q and
Vertical-direction relative position [VerPos]=2Q.

However, the non-processing pixels pm2 to pm4 do not have the quantized relative position information.

The relative-position-copy processing section 503 performs sequential copy processing, to non-processing pixels, of the quantized relative position information corresponding to the processing pixels, namely, Horizontal-direction relative position [HorPos]=nQ and
Vertical-direction relative position [VerPos]=mQ.

In the example in the figure, the quantized relative position information on pm1, that is to say, Horizontal-direction relative position [HorPos]=2Q and Vertical-direction relative position [VerPos]=2Q are copied to the quantized relative position information corresponding to the non-processing pixels pm2 to pm4. As a result, all the pixels pm1 to pm4 have the same quantized relative position information, namely, Horizontal-direction relative position [HorPos]=2Q and Vertical-direction relative position [VerPos]=2Q.

In the same manner for the rest of the pixels, the quantized relative position information of the adjacent constituent pixel of the motion compensation image (MC image) having the quantized relative position information is copied to the constituent pixels of the motion compensation image (MC image) not having the quantized relative position information.

The motion-compensation-image generation section 504 receives input of the copied quantized-relative-position information for each plurality of pixels from the relative-position-copy processing section 503, and calculates the pixel values of the constituent pixels of the motion compensation image (MC image). In this regard, in the same manner as the second embodiment described above, in this processing, the motion-compensation-image generation section 504 calculates the pixel value of each pixel using an SIMD (Single Instruction Multiple Date) processor, which is a calculation processing unit calculating the pixel values of the constituent pixels of the motion compensation image (MC image). For example, it is possible to perform parallel calculation on the input data in units of 32 bits to calculate the pixel values of four pixels in parallel. In the same manner as the second embodiment, high-speed processing is achieved by the calculation with a plurality of pixels being put together into one group.

Finally, a description will be given of an example of a hardware configuration of a personal computer as an example of a hardware configuration of an apparatus performing the above-described processing with reference to FIG. 17. A CPU (Central Processing Unit) 701 performs various processing in accordance with the programs stored in a ROM (Read Only Memory) 702 or a storage section 708. For example, the CPU executes the program generating the motion compensation image (MC image) described in the above-described embodiments. A RAM (Random Access Memory) 703 appropriately stores the programs executed by the CPU 701, data, etc. The CPU 301, the ROM 702, and the RAM 703 are mutually connected through a bus 704.

The CPU 701 is connected to an input/output interface 705 through the bus 704. An input section 706 including a keyboard, a mouse, a microphone, etc., and an output section 707 including a display, a speaker, etc., are connected to the input/output interface 705. The CPU 701 executes various kinds of processing in accordance with instructions input from the input section 706. The CPU 701 outputs the result of the processing to the output section 707.

The storage section 708 connected to the input/output interface 705 includes, for example, a hard disk, and stores the programs executed by the CPU 701 and various kinds of data. A communication section 709 communicates with external apparatuses through a network such as the Internet, a local area network, etc.

A drive 710, which is connected to the input/output interface 705, drives a removable medium 711, such as a magnetic disk, an optical disc, a magneto-optical disc, or a semiconductor memory, etc., and obtains the programs, the data, etc.,
recorded there. The obtained programs and data are transferred to the storage section 708 as necessary, and are stored there.

The present invention has been explained in detail by referring to the specific embodiments. However, it is obvious that those skilled in the art can perform modifications and substitutions on the embodiments without departing from the spirit of the present invention. That is to say, the present invention has been disclosed in a form of an example, and should not be limitedly interpreted. In order to determine the gist of the present invention, the appended claims should be taken into account.

Also, the series of processing described in the specification can be executed by hardware or by software or by the combination of both of these. When the processing is executed by software, the programs recording the processing sequence may be installed in a memory of a computer built in a dedicated hardware. Alternatively, the various programs may be installed and executed in a general-purpose computer capable of executing various processing. For example, the programs may be recorded in a recording medium in advance. In addition to installation from a recording medium to a computer, the programs may be received through a network, such as a LAN (Local Area Network) and the Internet, and may be installed in a recording medium, such as an internal hard disk, etc.

In this regard, the various processing described in this specification may be executed not only in time series in accordance with the description, but also may be executed in parallel or individually in accordance with the processing ability of the apparatus executing the processing or as necessary. Also, a system in this specification is a logical set of a plurality of apparatuses, and is not limited to a set of constituent apparatuses that are contained in a same casing.

What is claimed is:

1. An image processing apparatus, comprising:
    a pixel-relative-position calculation section for calculating a relative position between a pixel position of a first pixel constituting the motion compensation image and a pixel position of a reference pixel of a reference image, the reference image being used for calculating a pixel value of the first pixel on the basis of motion vector information;
    a relative-position quantization section for performing quantization processing of the relative position calculated by the pixel-relative-position calculation section to generate quantized-relative-position information;
    a relative-position-averaging processing section for receiving the quantized-relative-position information and performing averaging processing of the quantized-relative-position information corresponding to a plurality of pixels of the motion compensation image; and
    a motion-compensation-image generation section for generating a motion compensation image by calculating a pixel value of a constituent pixel of the motion compensation image on the basis of at least the quantized-relative-position information and a pixel value of the reference pixel, wherein:
        the relative-position-averaging processing section performs the averaging processing of the quantized-relative-position information such that the quantized relative position becomes identical for a number of pixels determined in accordance with a number of bits capable of being operated in parallel in the motion-compensation-image generation section; and
        the motion-compensation-image generation section generates the motion compensation image by calculating the constituent pixel value on the basis of at least the reference pixel value and the quantized-relative-position information set to have an identical value for each of the plurality of pixels generated by the relative-position-averaging processing section.

2. The image processing apparatus of claim 1, wherein the motion-compensation-image generation section performs pixel-value calculation applying an SIMD (Single Instruction Multiple Data) processor, performs parallel calculation for each of the plurality of pixels having the quantized-relative-position information set to have the identical value, and calculates pixel values corresponding to the plurality of pixels.

3. The image processing apparatus of claim 1, further comprising a relative-position-copy processing section, wherein:
the pixel-relative-position calculation section calculates the relative position based on at least a processing pixel selected from the pixels constituting the motion compensation image,
the relative-position quantization section performing quantization processing of the relative-position information corresponding to the processing pixel, the processing pixel being associated with a corresponding relative position calculated by the pixel-relative-position calculation section,
the relative-position-copy processing section performs setting processing of a quantized relative position identical to that of the processing pixel, the processing pixel being associated with a quantized relative position that is calculated for a non-processing pixel for which a quantized relative position is not calculated, and
the motion-compensation image generation section generates a motion compensation image by calculating the constituent pixel value on the basis of the quantized-relative-position information input from the relative-position-copy processing section and the reference pixel value.

4. The image processing apparatus of claim 1, wherein the pixel-relative-position calculation section calculates the first pixel value on the basis of a global motion vector (GMV), the global motion vector being a motion vector common to a plurality of blocks included in an image frame.

5. A computer-implemented method of processing an image, the method comprising:
calculating a relative position between a pixel position of a first pixel constituting the motion compensation image and a second pixel position of a reference pixel of a reference image, the reference image being used for calculating a pixel value of the first pixel on the basis of motion vector information;
performing quantization processing of the relative position calculated by the pixel-relative-position calculation section to generate quantized-relative-position information;
performing averaging processing of the quantized-relative-position information corresponding to a plurality of pixels of the motion compensation image; and
generating the motion compensation image by calculating a pixel value of a constituent pixel of the motion compensation image on the basis of the quantized-relative-position information and the reference pixel value, wherein:
performing the averaging processing comprises processing the quantized-relative-position information such that the quantized relative position becomes identical for a number of pixels determined in accordance with a number of bits capable of being operated in parallel in the motion-compensation-image generation section; and
the generating comprises generating the motion compensation image by calculating the constituent pixel value on the basis of at least the reference pixel value and the quantized-relative-position information set to have an identical value for each of the plurality of pixels generated by the relative-position-averaging processing section.

6. The method of claim 5, wherein the step of motion-compensation-image generating performs pixel-value calculation applying an SIMD (Single Instruction Multiple Data) processor, performing parallel calculation for each of the plurality of pixels having the quantized-relative-position information set to have the identical value, and calculating pixel values corresponding to the plurality of pixels.

7. The method of claim 5,
further comprising calculating the relative position based on at least a processing pixel selected from the pixels constituting the motion compensation image, wherein:
performing the quantization processing comprises processing the relative-position information corresponding to the processing pixel, the processing pixel being associated with a corresponding relative position calculated by the pixel-relative-position calculation section;
calculating the relative position comprises setting processing of a quantized relative position identical to that of the processing pixel, the processing pixel being associated with a quantized relative position that is calculated for a non-processing pixel for which a quantized relative position is not calculated, and
generating the motion compensation image comprises calculating the constituent pixel value on the basis of the quantized-relative-position information input from the relative-position-copy processing section and the reference pixel value.

8. The method of claim 5, wherein calculating the relative position calculating the first pixel value on the basis of a global motion vector (GMV), the global motion vector being a motion vector common to a plurality of blocks included in an image frame.

9. A non-transitory, computer-readable storage medium storing a program that, when executed by a processor, causes the processor to perform a method for generating a motion compensation (MC) image, the method comprising:
calculating a relative position between a pixel position of a first pixel constituting the motion compensation image and a second pixel position of a reference pixel of a reference image, the reference image being used for calculating a pixel value of the first pixel on the basis of motion vector information;
performing quantization processing of the relative position calculated by the pixel-relative-position calculation section to generate quantized-relative-position information;
performing averaging processing of the quantized-relative-position information corresponding to a plurality of pixels of the motion compensation image; and
generating the motion compensation image by calculating a pixel value of a constituent pixel of the motion compensation image on the basis of the quantized-relative-position information and the reference pixel value, wherein:
performing the averaging processing comprises processing the quantized-relative-position information such that the quantized relative position becomes identical for a number of pixels determined in accordance with a number of bits capable of being operated in parallel in the motion-compensation-image generation section; and the generating comprises generating the motion compensation image by calculating the constituent pixel value on the basis of at least the reference pixel value and the quantized-relative-position information set to have an identical value for each of the plurality of pixels generated by the relative-position-averaging processing section.

* * * * *